United States Patent [19]

Naito et al.

[11] Patent Number: 6,045,198
[45] Date of Patent: Apr. 4, 2000

[54] ANTISKID BRAKE CONTROLLER

[75] Inventors: Yasuo Naito; Hiroyuki Tsuji, both of Tokyo, Japan

[73] Assignee: Mitsubishi Denki Kabushiki Kaisha, Tokyo, Japan

[21] Appl. No.: 08/967,931

[22] Filed: Nov. 12, 1997

[30] Foreign Application Priority Data

Jun. 5, 1997 [JP] Japan ..................................... 9-147958

[51] Int. Cl.$^7$ ..................................................... B60T 8/60
[52] U.S. Cl. ........................... 303/154; 303/149; 303/150
[58] Field of Search ..................................... 303/149, 150, 303/154, 157, 183

[56] References Cited

U.S. PATENT DOCUMENTS

| 5,092,662 | 3/1992 | Okubo ..................................... 303/150 |
| 5,385,393 | 1/1995 | Tanaka et al. ........................... 303/150 |
| 5,421,644 | 6/1995 | Prescott et al. ......................... 303/150 |
| 5,466,054 | 11/1995 | Okazaki ................................... 303/149 |
| 5,676,434 | 10/1997 | Ichikawa et al. ....................... 303/150 |

FOREIGN PATENT DOCUMENTS

| 0497095 | 8/1992 | European Pat. Off. . |
| 3814457 | 11/1989 | Germany . |
| 4239177 | 5/1994 | Germany . |
| 8-239024 | 9/1996 | Japan . |

*Primary Examiner*—Mark T. Le
*Assistant Examiner*—Robert A. Siconolfi
*Attorney, Agent, or Firm*—Sughrue, Mion, Zinn, Macpeak & Seas, PLLC

[57] ABSTRACT

An antiskid brake controller, which can secure a sufficient braking capability, avoid a locked state and maintain high reliability regardless of a road surface state without using a road sensor, includes a detector for detecting respective wheel speeds, a braking force adjustment unit which responds to the application of a brake and an electronic control unit (ECU) for calculating a control amount to the braking force adjustment unit to prevent the locking tendencies of respective wheels. The ECU includes a wheel deceleration calculator for calculating the wheel decelerations corresponding to the locking tendencies, a grouping unit for grouping the respective wheel speeds to a plurality of groups, a calculator for calculating a basic wheel speed based on the respective wheel speeds of the groups, a unit for presuming road surface friction factors based on the change in time of the basic vehicle speed, a threshold setting unit for variably setting the threshold values of the wheel decelerations in accordance with road surface friction factors and a calculation unit for calculating control amounts based on the result of comparison of the wheel decelerations with the threshold values.

10 Claims, 16 Drawing Sheets

ANTISKID BRAKE CONTROLLER

BACKGROUND OF THE INVENTION

1. Field of the Invention

The present invention relates to an antiskid brake controller for preventing wheels from being locked to a road surface on which a vehicle travels, and more specifically, to an antiskid brake controller capable of maintaining high reliability to a difference of road surface friction factors without the use of a road surface sensor.

2. Description of the Related Art

Conventionally, there have been well known antiskid brake controllers which avoid a wheel-locked-state by presumingly calculating a vehicle speed and wheel decelerations based on the wheel speeds of respective wheels when a brake is applied and reducing a braking pressure when necessary. These controllers are generally called ABS (antiskid brake system).

In this type of the controllers, since the threshold values (corresponding to a locked state) of wheel decelerations are set in accordance with road surface states (road surface friction factors) and each time the wheel decelerations exceed the threshold values, a braking pressure is reduced to thereby obtain a maximum braking force within a range in which no wheel-locked-state is caused, it is preferable to set optimum threshold values in accordance with the road states.

FIG. 14 is a block diagram showing the schematic arrangement of a conventional antiskid brake controller disclosed in, for example, Japanese Unexamined Patent Publication No. 8-239024, FIG. 15 is a view specifically showing the arrangement of a hydraulic passage in the vicinity of actuators in FIG. 14 and FIG. 16 is a view showing the arrangement of the actuator in FIG. 14 in more detail paying attention to a wheel.

In the respective drawings, four wheels 1a–1d for driving a vehicle are composed of the front wheels 1a and 1b as driving wheels and rear wheels 1c and 1d as non-driving wheels.

Wheel speed sensors (wheel speed sensing means) 2a–2d for independently detecting the rotational speeds of the respective wheels 1a–1d as wheel speed signals Va–Vd are composed of an electromagnetic pickup type speed sensor or a photoelectric transducing type speed sensor.

The wheel speed sensor 2a mounted in the vicinity of the wheel 1a creates the wheel speed signal Va in accordance with the rotation of the wheel 1a and the wheel speed sensors 2b–2d mounted in the vicinity of the respective wheels 1b–1d create the wheel speed signals Vb–Vd in accordance with the rotations of the wheels 1b–1d likewise.

In FIG. 15, the driving wheels, that is, the front wheels 1a and 1b are coupled with an engine 6 through a driving shaft 4 and a differential mechanism 5, whereas the non-driving wheels, that is, the rear wheels 1c and 1d are not coupled with the engine 6.

Braking units 7a–7d constituting the braking means of the vehicle are composed of wheel cylinders which are pressed against the respective wheels 1a–1d in accordance with braking pressures Pa–Pd and individually disposed to the respective wheels 1a–1d.

A master cylinder 9 is coupled with a brake pedal 8 which is actuated by the driver when the brake is applied to create a braking pressure (hydraulic pressure) in response to an amount of depression of the brake pedal 8.

The master cylinder 9 has actuators 10a–10d which are coupled therewith through a hydraulic passage and composed of a hydraulic unit including electromagnetic solenoids.

The actuators 10a–10d adjust the braking pressure created by the master cylinder 9 in accordance with control signals Ca–Cd (to be described later) and individually supply the thus adjusted braking pressures to the respective brake units 7a–7d.

With this operation, the brake units 7a–7d generate braking forces to the respective wheels 1a–1d in accordance with the amount of actuation of the brake pedal 8 and in response to the control signals Ca–Cd.

In FIG. 14, an ECU (electronic control unit) 11 mounted on the vehicle constitutes the main body of the antiskid brake controller and includes waveform shaping/amplifying circuits 20a–20d, a power supply circuit 22, a microcomputer 23, actuator driving circuits 24a–24d and a motor relay driving circuit 25.

The microcomputer 23 in the ECU 11 includes a CPU 23a for executing various types of calculations and a RAM 23b and a ROM 23c which belong to the CPU 23a.

The ECU 11 constitutes wheel deceleration calculation means which individually calculates wheel decelerations corresponding to the locking tendencies of the respective wheels 1a–1d based on the differential waveforms of wheel speeds Vwa–Vwd obtained from the respective wheel speed signals Va–Vd when the brake is applied.

The ECU 11 further constitutes control amount calculation means for braking force adjustment means which is composed of the actuators 10a–10d, a motor 15 and a motor relay 16. The control amount calculation means executes the calculation for the prevention of the locking tendencies (antiskid control) based on the respective wheel decelerations and adjusts the braking pressures Pa–Pd to the respective wheels 1a–1d by creating the control signals Ca–Cd to the actuators 10a–10d and a control signal CM to the motor relay 16.

The braking force adjustment means adjusts the braking pressures Pa–Pd to the respective wheels 1a–1d in response to the actuation of the brake pedal 8 and based on the control signals Ca–Cd and CM.

The respective waveform shaping/amplifying circuits 20a–20d convert the respective wheel speed signals Va–Vd into pulse signals suitable to calculation and inputs them to the microcomputer 23. The microcomputer 23 calculates the wheel speeds Vwa–Vwd of the respective wheels 1a–1d from the wheel speed signals Va–Vd and uses them to calculate the control signals Ca–Cd.

The power supply circuit 22 supplies a constant voltage to the microcomputer 23 when an ignition switch 27 is turned ON.

The respective actuator driving circuits 24a–24d individually output the control signals Ca–Cd to the electromagnetic solenoids of the respective actuators 10a–10d in response to the control command from the microcomputer 23.

The motor 15 constituting a braking pressure adjusting pump is energized through the normally open contact 16a of the motor relay 16 in response to the control signal CM from the ECU 11 to thereby adjust the braking pressure Pa–Pd in relation to the respective actuators 10a–10d.

The motor relay 16 includes a coil 16b for closing the normally open contact 16a in response to the control signal CM.

The motor 15 and the motor relay 16 constitute the braking force adjustment means for adjusting the braking pressures Pa–Pd to the respective wheels 1a–1d in response to the actuation of the brake together with the actuators 10a–10d.

The motor relay driving circuit 25 in the ECU 11 outputs the control signal CM to the motor relay 16 when the braking pressures are adjusted and drives the motor 15 by turning on the normally open contact 16a by energizing the coil 16b of the motor relay 16.

As shown in FIG. 15, a reservoir tank 14 is disposed to a portion of a circulating hydraulic passage between the motor 15 and the respective actuators 10a–10d in the vicinity of the motor 15 to supply and collect a hydraulic pressure to and from the respective actuators 10a–10d through the hydraulic passage.

When attention is paid to one of the actuators (for example, the actuator 10a) in FIG. 15, it is arranged as shown in FIG. 16.

In FIG. 16, the actuator 10a includes a pressure maintaining solenoid valve 12 and a pressure reducing solenoid valve 13 and the other not shown actuators 10b–10d have the same arrangement.

The pressure maintaining solenoid valve 12 is disposed to the inlet hydraulic passage from the master cylinder 9 to the brake unit 7a and the pressure reducing solenoid valve 13 is disposed to the outlet hydraulic passage from the brake unit 7a to the reservoir tank 14.

That is, the pressure reducing solenoid valve 13 is disposed to the liquid pressure collecting passage from the reservoir tank 14 to the master cylinder 9 through the motor 15 for supplying and collecting the liquid pressure.

With this arrangement, the respective solenoid values 12, 13 are energized or deenergized in response to the control signal Ca from the ECU 11 to thereby switch the maintenance, the increase and the reduction of the braking pressure.

Ordinarily, the pressure maintaining solenoid valve 12 is opened and the pressure reducing solenoid valve 13 is closed.

In FIG. 16, when the driver depresses the brake pedal 8, a pressure is supplied to the master cylinder 9 and the braking fluid fed from the master cylinder 9 flows into the braking unit 7a through the pressure maintaining solenoid valve 12 in the actuator 10a to thereby increase the braking pressure Pa.

When a wheel deceleration corresponding to a locked state is detected and the control signal Ca indicating pressure reduction is created by the ECU 11, the electromagnetic solenoids of the pressure maintaining solenoid valve 12 and the pressure reducing solenoid valve 13 are driven by being energized.

At the time, the pressure maintaining solenoid valve 12 is closed to thereby shut off the hydraulic passage from the master cylinder 9 to the brake unit 7a.

Further, the pressure reducing solenoid valve 13 is opened to thereby connect the hydraulic passage from the braking unit 7a to the reservoir tank 14.

Therefore, the braking fluid in the brake unit 7a flows into the reservoir tank 14 and the braking pressure Pa is reduced.

At the same time, since the ECU 11 creates the control signal CM for energizing the motor relay 16 and operates the motor 15, the pressure of the braking fluid having flown into the reservoir tank 14 is increased and the braking fluid having the increased pressure is returned to the main passage on the master cylinder 9 side to be used in the next brake control.

Thereafter, when the ECU 11 creates the control signal Ca for maintaining pressure and only the pressure maintaining solenoid valve 12 is energized (the passage is closed), since the other valves are deenergized, all the hydraulic passages are shut off and the braking pressure Pa to the wheel 1a is maintained.

When the ECU 11 creates the control signal Ca for increasing pressure and the pressure maintaining solenoid valve 12 and the pressure reducing solenoid valve 13 are deenergized, the hydraulic passage between the master cylinder 9 and the brake unit 7a is connected again.

With this operation, since the high pressure braking fluid having been returned to the main passage on the master cylinder 9 side flows into the brake unit 7a again together with the braking fluid discharged from the motor 15, the braking pressure Pa to the wheel 1a is increased.

FIG. 17 is a timing chart showing the above antiskid brake control operation. The timing chart shows the change in time of each of the wheel speed Vwa calculated from the wheel speed signal Va, the wheel deceleration Gwa and the braking pressure Pa, and what is shown here is a case that the braking pressure Pa is relatively preferably adjusted.

In the drawing, the abscissa shows a time t and it is assumed that the wheel deceleration Gwa in a downward direction (negative acceleration) is in a positive direction and the braking pressure (braking hydraulic pressure) Pa in an upward direction is in an pressure increasing direction.

In FIG. 17, a basic vehicle speed Vr (refer to a dot-dash-line) is determined based on the wheel speed Vwa and a threshold value A relating to the wheel deceleration Gwa (refer to a dot-dash-line) is determined based on the maximum value of a road surface friction factor $\mu$ (peak value $\mu$P).

The road surface friction factor $\mu$ is presumed based on the change in time (inclination) of the waveform of the wheel speed Vwa.

First, when the driver depresses the brake pedal 8 at a time t1, the level of the wheel speed Vwa is reduced by the increase of the braking pressure Pa.

At the time, when the wheel deceleration Gwa exceeds the threshold value A corresponding to a locked state as shown by the slant lines in FIG. 17, the braking pressure Pa is reduced to thereby prevent the occurrence of the locked state beforehand.

That is, since the braking pressure Pa is maximized at a time t2 when the wheel deceleration Gwa exceeds the threshold value A as well as a slip larger than a predetermined amount occurs, it is reduced by the commencement of antiskid brake control.

Thereafter, the braking pressure Pa is maintained to a constant value from a time t3 and the waveform of the wheel speed Vwa approaches the basic wheel speed Vr during the time.

The braking pressure Pa starts to be increased at a time t4 when the wheel deceleration Gwa is made equal to or smaller than the threshold value A as well as the slip is also made equal to or smaller than the predetermined amount and the increase of the pressure Pa is continued until a time t5 when the wheel deceleration Gwa exceeds the threshold value A.

As shown by the slant lines in FIG. 17, when the wheel deceleration Gwa exceeds the threshold value A at the time t5 again, the braking pressure Pa is reduced likewise and thereafter the occurrence of the locked state is prevented beforehand by repeating the same operation as above.

To realize the ideal antiskid brake control as shown in FIG. 17, for example, the threshold value A must be set larger than the maximum value of the road surface friction factor $\mu$.

The antiskid brake control is also executed to the other wheels $1b$–$1d$ in the same manner as above.

As described above, the locked state of the wheel $1a$ can be avoided by adjusting the braking pressure Pa by repeating the reduction, maintenance and increase of the braking pressure Pa in response to the control signal Ca from the ECU 11.

Incidentally, the threshold value A must be properly set in correspondence to the road surface friction factor $\mu$ as the antiskid control condition of the braking pressure Pa as described above. For this purpose, it is preferable to presume the road surface friction factor $\mu$ based on the basic vehicle speed Vr calculated from the wheel speed and to change the threshold value A of the wheel deceleration Gwa in accordance with the presumed road surface friction factor $\mu$.

However, the conventional antiskid controllers set the threshold value A as a condition for adjusting the braking pressure Pa constant regardless of the road surface friction factor $\mu$. Thus, if the road surface friction factor $\mu$ is low, since the braking pressure Pa cannot be reduced until the wheel deceleration Gwa is greatly reduced, the occurrence of the locked state cannot be prevented.

Whereas, when the road surface friction factor $\mu$ is high, since the braking pressure Pa is reduced to a degree larger than necessary, a braking capability is reduced and a long time is required until the vehicle stops.

To solve the above problem, the controller disclosed in, for example, Japanese Unexamined Patent Publication No. 8-239024 is arrange such that the peak value of the road surface friction factor $\mu$, that is, a maximum road surface friction factor $\mu$P is set as the threshold value A and the braking pressure Pa is reduced based on the difference between the threshold value A (=$\mu$P) and the wheel deceleration Gw.

However, it is very difficult to presume the maximum road surface friction factor $\mu$P because a road surface ceaselessly changes as the vehicle travels.

Further, since the wheel deceleration Gw is liable to be made to a fluctuating waveform by the effect of a disturbance noise (the vibration of the vehicle) which occurs when the wheel speed Vw is detected and further the magnitude of the disturbance noise changes in accordance with the road surface friction factor $\mu$, a braking capability is made insufficient by the execution of useless pressure reduction.

FIG. 18 is a timing chart showing the change in time of the braking pressure Pa when the road surface friction factor $\mu$ is high or when a road is bad with many irregularities.

In FIG. 18, the wheel deceleration Gw fluctuates in the vicinity of the maximum road surface friction factor $\mu$P due to the disturbance noise occurred when the vehicle travels and the threshold value A (refer to a broken line) is set to a level larger than the maximum road surface friction factor $\mu$P (refer to a dot-dash line).

In general, the wheel deceleration Gw is liable to fluctuate in the vicinity of the maximum road surface friction factor $\mu$P as shown in FIG. 18 by the resonation caused by the tires of the vehicle and the spring members thereof such as suspensions and the like and the rigidity component of the mounting parts of the wheel speed sensors $2a$–$2d$ and the brake units $7a$–$7d$ (refer to FIG. 14–FIG. 16).

In this case, when the maximum road surface friction factor $\mu$P is set as the threshold value, since the braking pressure is reduced to a degree larger than necessary each time the wheel deceleration Gw exceeds the maximum road surface friction factor $\mu$P, a sufficient braking capability cannot be obtained.

To prevent the above problem, the threshold value A is set to a level which is higher than the maximum road surface friction factor $\mu$P by a value corresponding to a disturbance noise component.

However, as apparent from FIG. 18, since a short pressure reducing period T is repeated due to the fluctuation of the wheel deceleration Gw, the braking pressure P cannot be sufficiently reduced.

Further, a pressure reduction cannot be executed in correspondence to a road whose surface changes from a state that the maximum road surface friction factor $\mu$P is large to a state that the maximum road surface friction factor $\mu$P is small.

In addition, although the maximum road surface friction factor $\mu$P is to be presumed from the wheel speed Vw, actually it is difficult to presume the maximum road surface friction factor $\mu$P and what can be made at the best is to detect an average road surface friction factor suitable to a road surface at a time.

As described above, since it is not only difficult for the conventional antiskid brake controllers to detect or presumingly calculate the maximum road surface friction factor $\mu$P correctly but also the braking pressure is reduced based on the constant threshold value A, the threshold value A cannot be suitably set in correspondence to the road surface friction factor $\mu$. Thus, there is a problem that an optimum lock avoiding control suitable to a road surface state cannot be realized without sacrificing a braking capability.

An object of the present invention is to solve the above problems by providing an antiskid brake controller capable of securing a sufficient braking capability as well as securely avoiding a locked state by presuming a road surface friction factor based on a basic vehicle speed calculated from wheel speeds and setting a proper threshold value in accordance with a road surface state.

Another object of the present invention is to provide an antiskid brake controller capable of securing a sufficient braking capability as well as securely avoiding a locked state by setting a plurality of smoothed slip characteristics, a plurality of smoothed wheel deceleration characteristics and a plurality of threshold values in accordance with a magnitude of a slip as braking pressure adjusting conditions.

SUMMARY OF THE INVENTION

An antiskid brake controller according to the present invention comprises wheel speed sensing means for individually detecting the rotational speeds of a plurality of wheels as wheel speeds; braking force adjustment means for adjusting a braking force to each of the respective wheels in response to the application of a brake; and an ECU for calculating control amounts to the braking force adjustment means based on the wheel speeds when the brake is applied so as to prevent the locking tendencies of the respective wheels, wherein the ECU comprises wheel deceleration calculation means for individually calculating wheel decelerations in accordance with the locking tendencies of the respective wheels based on the respective wheel speeds when the brake is applied; grouping means for grouping the respective wheel speeds to a plurality of groups; basic wheel speed calculation means for calculating basic vehicle speeds based on the respective wheel speeds of the respective groups; road surface friction factor presuming means for presuming a road surface friction factor based on the change in time of the basic vehicle speed when the brake is applied; threshold value setting means for variably setting the threshold values of the wheel decelerations in accordance with the road surface friction factor; and control amount calculation means for calculating the control amounts based on the result of comparison of the wheel decelerations with the threshold values.

The road surface friction factor presuming means of the antiskid brake controller according to the present invention individually determines the road surface friction factors to the basic vehicle speeds of the respective groups; the threshold value setting means individually sets the threshold values in accordance with the respective road surface friction factors; and the control amount calculation means individually calculates the control amounts based on the result of comparison of the wheel decelerations of the respective groups with the threshold values thereof.

The basic vehicle speed calculation means of the antiskid brake controller according to the present invention includes basic vehicle speed selection means for selecting one of the basic vehicle speeds of the respective groups; the road surface friction factor presuming means presumes the road surface friction factor based on the change in time of the selected basic vehicle speed; and the threshold value setting means sets a plurality of threshold values in accordance with the road surface friction factor.

The antiskid brake controller according to the present invention comprises first filter processing means for subjecting the wheel decelerations to a filter processing with a relatively prompt response characteristic and creating first wheel deceleration filtering values; and second filter processing means for subjecting the wheel decelerations to a filter processing with a response characteristic which is slower than that of the first filter processing means and creating second wheel deceleration filtering values, wherein the threshold value setting means sets a first threshold value having a relatively large level and a second threshold value having a level smaller than that of the first threshold value depending upon the road surface friction factor, and the control amount calculation means comprises first comparison means for creating a first comparison output when the first wheel deceleration filtering value exceeds the first threshold value; and second comparison means for creating a second comparison output when the second wheel deceleration filtering value exceeds the second threshold value; whereby the control amount calculation means creates a control amount for reducing the braking pressure in response to at least one of the first and second comparison outputs.

The antiskid brake controller of the present invention comprises slip amount calculation means for calculating slip amounts for the respective wheels from the differences between the basic vehicle speed and the respective wheel speeds; first filter processing means for subjecting the slip amounts to a filter processing with a relatively prompt response characteristic and creating first slip amount filtering values; and second filter processing means for subjecting the slip mounts to a filter processing with a response characteristic which is slower than that of the first filter processing means and creating second slip amount filtering values, wherein the threshold value setting means sets a first threshold value having a relatively large level and a second threshold value having a level smaller than that of the first threshold value depending upon the road surface friction factor; and the control amount calculation means comprises first comparison means for creating a first comparison output when the wheel deceleration exceeds the first threshold value; second comparison means for creating a second comparison output when the wheel deceleration exceeds the second threshold value; allowable value setting means for setting the allowable value of the slip amount; third comparison means for creating a third comparison output when the first slip amount filtering value exceeds the allowable value; fourth comparison means for creating a fourth comparison output when the second slip amount filtering value exceeds the allowable value; a first AND circuit for creating a first AND output by ANDing the first comparison output with the third comparison output; a second AND circuit for creating a second AND output by ANDing the second comparison output with the fourth comparison output; and a OR circuit for creating a control amount for reducing the braking pressure in response to at least one of the first AND output and the second AND output.

The antiskid brake controller according to the present invention comprises slip amount calculation means for calculating slip amounts for the respective wheels from differences between the basic vehicle speed and the respective wheel speeds; wherein the threshold value setting means sets a first threshold value having a relatively large level and a second threshold value having a level smaller than that of the first threshold value depending upon the road surface friction factor; and the control amount calculation means comprises first comparison means for creating a first comparison output when the wheel deceleration exceeds the first threshold value; second comparison means for creating a second comparison output when the wheel deceleration exceeds the second threshold value; first allowable value setting means for setting a first allowable value having a relatively small level to the slip amount; second allowable value setting means for setting a second allowable value having a level larger than that of the first allowable value to the slip amount; third comparison means for creating a third comparison output when the slip amount exceeds the first allowable value; fourth comparison means for creating a fourth comparison output when the slip amount exceeds the second allowable value; a first AND circuit for creating a first AND output by ANDing the first comparison output with the third comparison output; a second AND circuit for creating a second AND output by ANDing the second comparison output with the fourth comparison output; and a OR circuit for creating a control amount for reducing the braking pressure in response to at least one of the first and second AND outputs.

The threshold value setting means of the antiskid brake controller according to the present invention individually sets the threshold values for the respective groups in accordance with the road surface friction factors, and the threshold value corresponding to the front wheels is set to a level larger than that of the threshold value corresponding to the rear wheels.

DESCRIPTION OF THE PREFERRED EMBODIMENTS

Embodiment 1

An embodiment 1 of the present invention will be described below.

Figure 1:
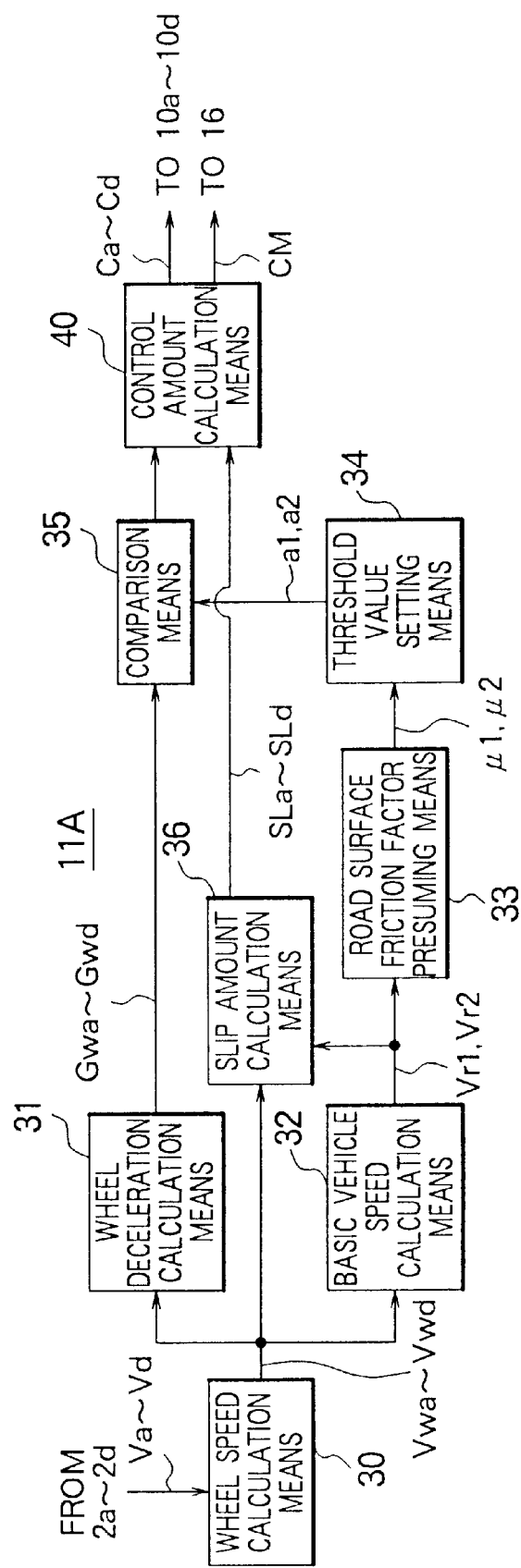
FIG. 1 is a function block diagram showing an embodiment 1 of the present invention.

FIG. 1 is a function block diagram showing the arrangement of an ECU 11A provided with the embodiment 1 of the present invention, wherein wheel speed sensors 2a–2d, actuators 10a–10d and a motor relay 16 are arranged likewise those described above.

Figure 14:
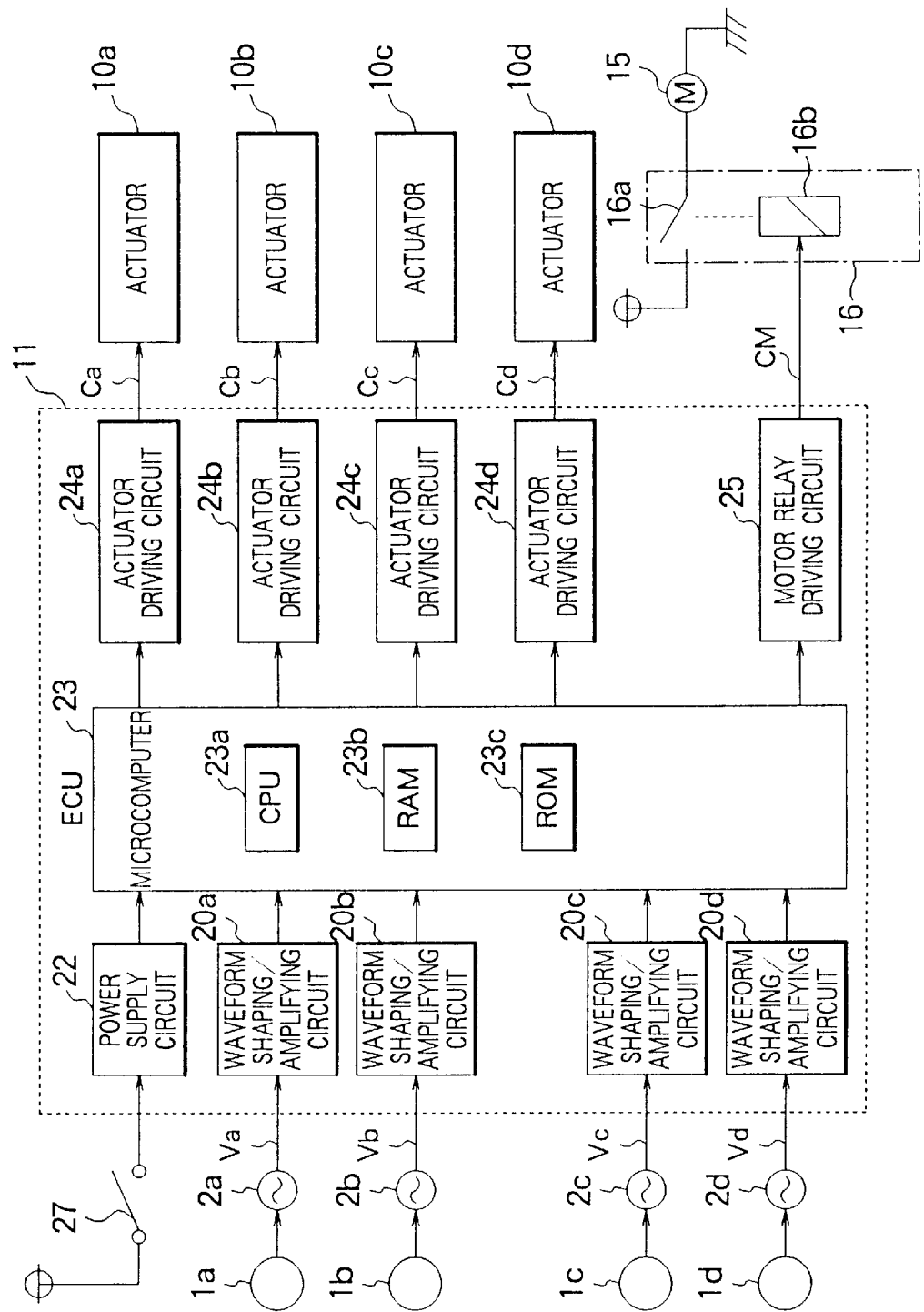
FIG. 14 is a block diagram showing the schematic arrangement of an ordinary antiskid brake controller.
Figure 15:
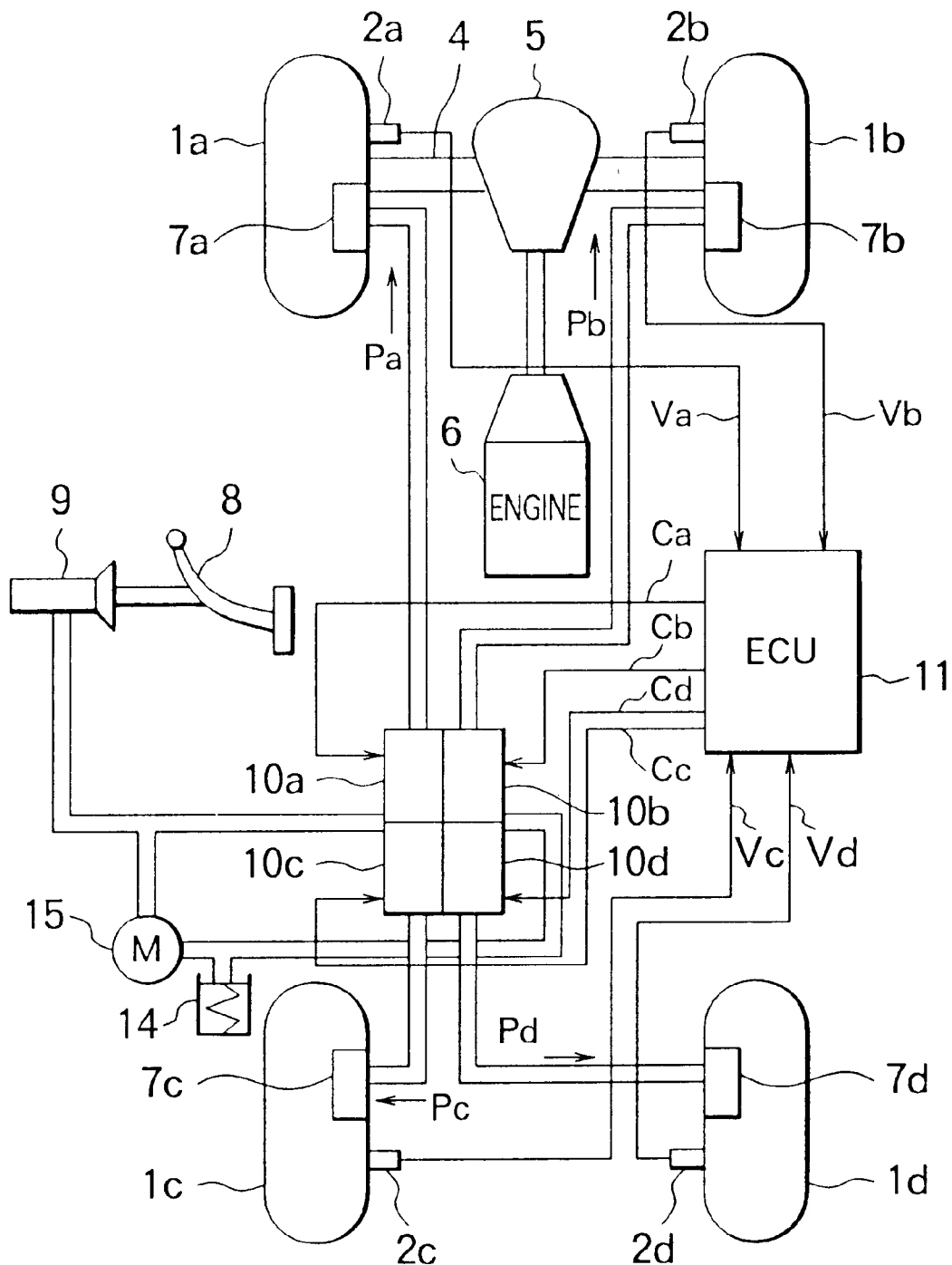
FIG. 15 is a block diagram showing the arrangement of a hydraulic passage in the vicinity of actuators in FIG. 14.
Figure 16:
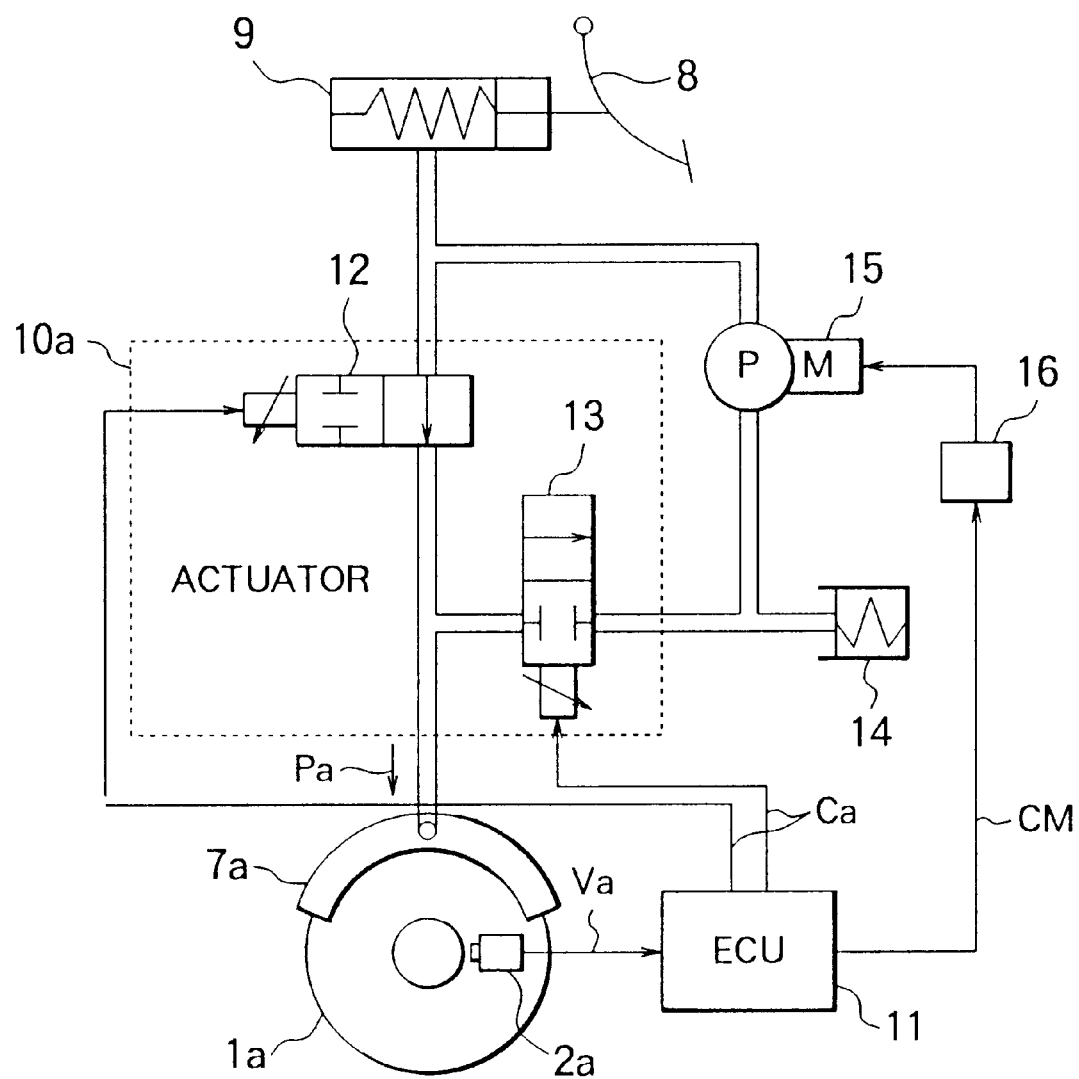
FIG. 16 is a block diagram of the arrangement showing the hydraulic passage in FIG. 15 paying attention to one system thereof.
Figure 17A:
FIG. 17 is a timing chart showing operation of a conventional antiskid brake controller when it is in a good operating state.
Figure 17B:
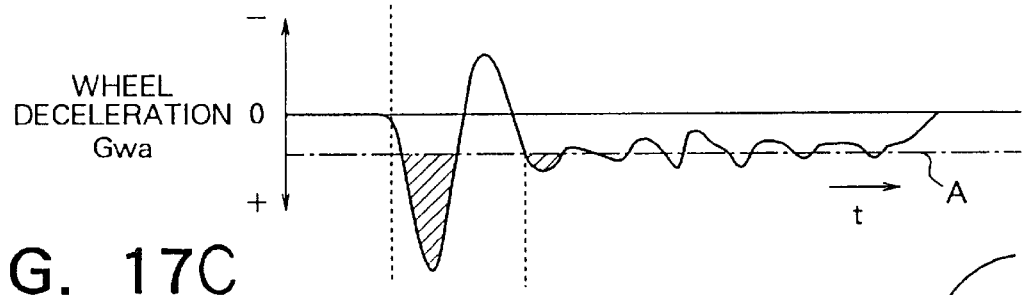
Figure 17C:
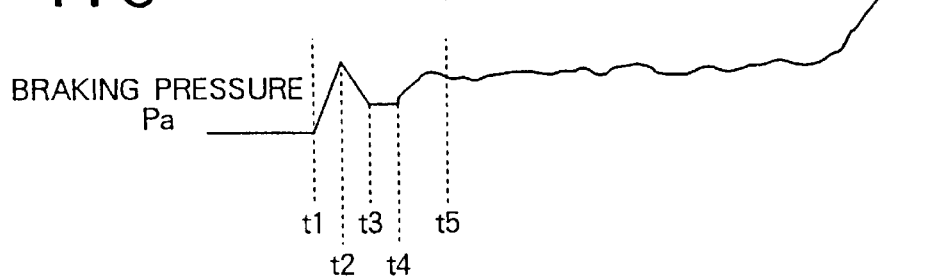
Figure 18A:
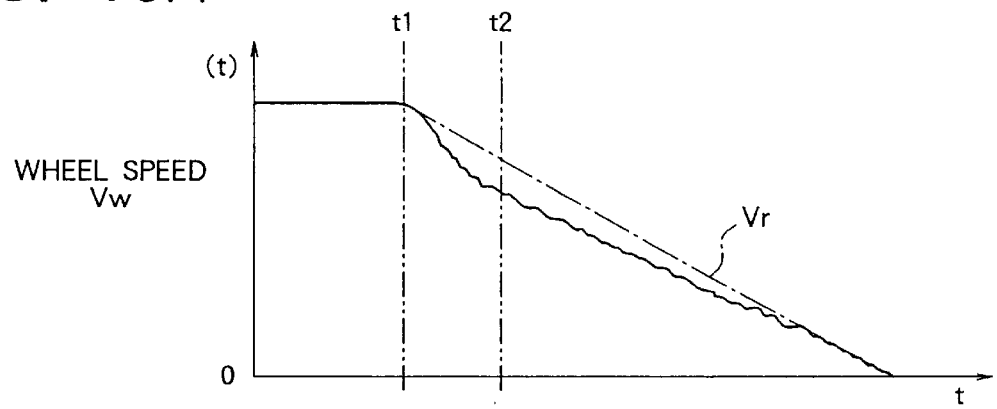
FIG. 18 is timing chart showing a problem of operation of the conventional antiskid brake controller.
Figure 18B:
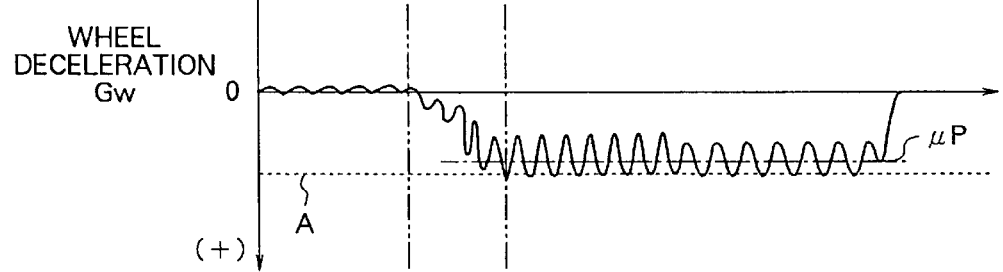
Figure 18C:
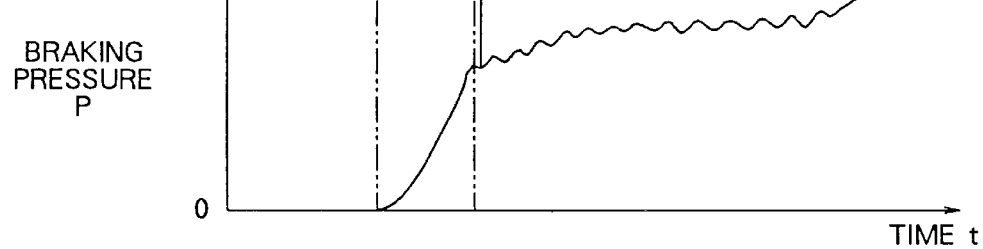

Further, the entire arrangement of the embodiment 1 of the present invention and the arrangement in the vicinity of the actuators and a motor are as shown in FIG. 14 to FIG. 16.

In this case, the ECU 11A includes wheel speed calculation means 30 for calculating respective wheel speeds Vwa–Vwd based on respective wheel speed signals Va–Vd when a brake is applied, wheel deceleration calculation means 31 for individually calculating wheel decelerations Gwa–Gwd corresponding to the locking tendencies of respective wheels 1a–1d and basic vehicle speed calculation means 32 for calculating basic vehicle speeds Vr1 and Vr2 based on the respective the wheel speeds Vwa–Vwd.

The basic vehicle speed calculation means 32 includes grouping means for grouping the respective wheel speeds Vwa–Vwd into a plurality of groups and calculates the respective basic vehicle speeds Vr1 and Vr2 based on the wheel speeds of the respective groups.

In this case, a first group includes the wheel speed Vwa of the front left wheel 1a and the wheel speeds Vwc and Vwd of the rear left and right wheels 1c and 1d and a second group includes the wheel speed Vwb of the front right wheel 1b and the wheel speeds Vwc and Vwd of the rear left and right wheels 1c and 1d.

The ECU 11A includes road surface friction factor presuming means 33 for presuming road surface friction factors $\mu 1$, $\mu 2$ based on the change in time of the basic vehicle speeds Vr1 and Vr2 when the brake is applied, threshold value setting means 34 for variably setting the threshold values a1, a2 of the wheel decelerations in accordance with the road surface friction factor $\mu 1$, $\mu 2$, comparison means 35 for comparing the wheel decelerations Gwa–Gwd with the threshold values a1, a2, slip amount calculation means 36 for calculating slip amounts SLa–SLd of the respective wheels 1a–1d from the differences between the basic vehicle speeds Vr1 and Vr2 and the respective wheel speeds Vwa–Vwd and control amount calculation means 40 for calculating control amounts based on the result of comparison from the comparison means 35 and the slip amounts SLa–SLd.

The control amount calculation means 40 creates control signals Ca–Cd and CM to the respective actuators 10a–10d and the motor relay 16 in accordance with the control amounts.

Note, although the comparison means 35 is shown separately from the control amount calculation means 40 here, it may be contained in the control amount calculation means 40 as a portion of the function thereof.

The road surface friction factor presuming means 33 individually determines the road surface friction factors $\mu 1$, $\mu 2$ to the basic vehicle speeds Vr1 and Vr2 of the respective groups and the threshold value setting means 34 individually sets the threshold values a1, a2 in accordance with the respective road surface friction factor $\mu 1$, $\mu 2$ and the control amount calculation means 40 individually calculates control amounts based on the result of comparison of the wheel deceleration Gwa–Gwd of the respective groups with the threshold values a1, a2.

The basic vehicle speed calculation means 32 may include basic vehicle speed selection means for selecting one of the basic vehicle speeds Vr1 and Vr2 of the respective groups when necessary.

In this case, the threshold value setting means 34 sets the plurality of threshold values a1, a2 in accordance with the road surface friction factor $\mu 1$ (or $\mu 2$) based on the respective basic vehicle speed Vr1 (or Vr2).

Figure 2:
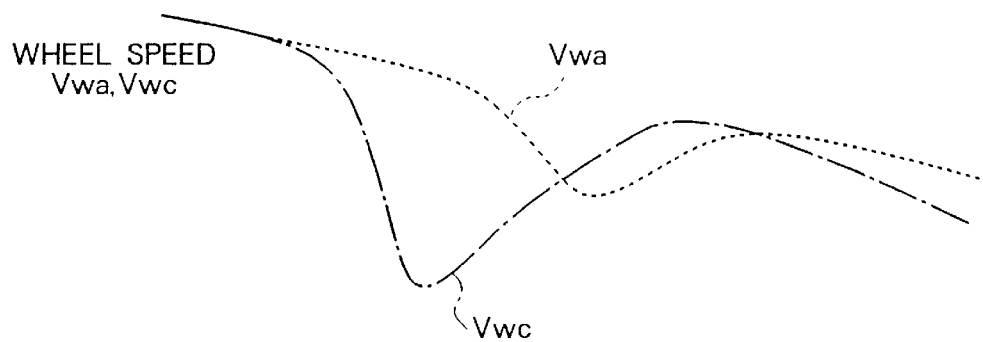
FIG. 2 is a waveform view showing the change of a plurality of wheel speeds used in the embodiment 1 of the present invention.

FIG. 2 is a waveform view showing an example (only two waveforms for convenience) of, for example, the wheel speeds Vwa and Vwc of the first group, wherein a broken line shows the wheel speed Vwa of the wheel 1a and a dot-dash-line shows the wheel speed Vwc of the wheel 1c.

Figure 3:
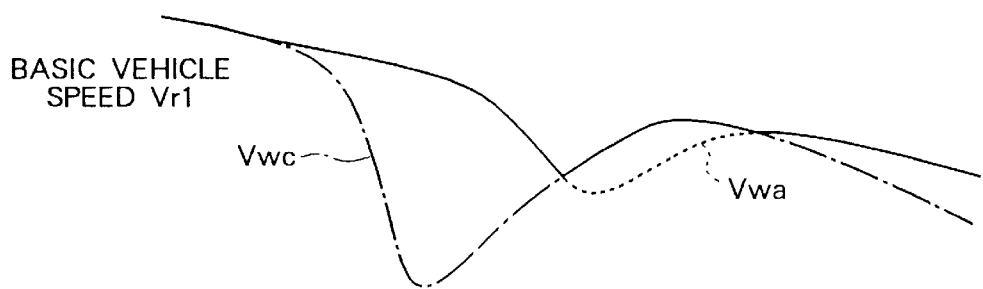
FIG. 3 is a waveform view showing basic vehicle speeds selected by the embodiment 1 of the present invention.

FIG. 3 is a waveform view showing an example of operation of the basic vehicle speed calculation means 32 for selecting the basic vehicle speed Vr1 and shown in the drawing is a case that the wheel speed having a maximum level (refer to a solid line) of the wheel speeds Vwa and Vwc is selected as the basic vehicle speed Vr1.

Figure 4:
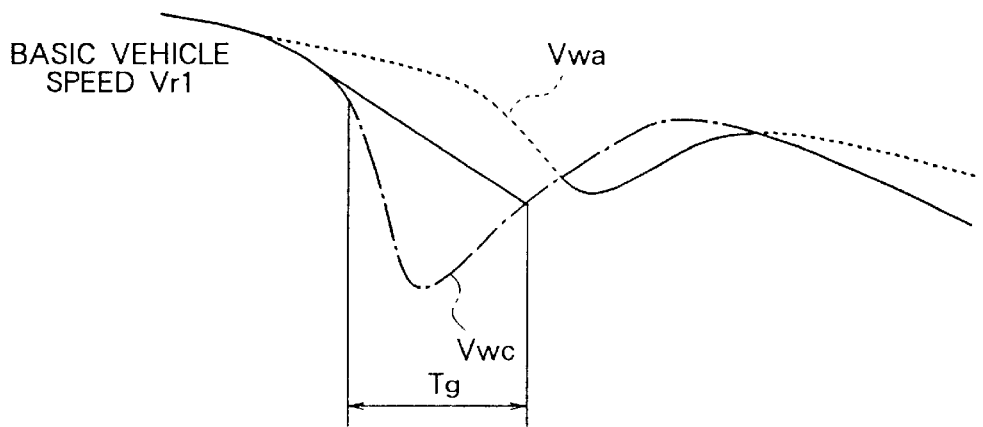
FIG. 4 is a waveform view showing a basic vehicle speed selected by the embodiment 1 of the present invention.

FIG. 4 is a waveform view showing another example of operation of the basic vehicle speed calculation means 32 for selecting the basic vehicle speed Vr1 and shown in the drawing is a case that the wheel speed having a second level (refer to a solid line) of the wheel speeds Vwa and Vwc is selected as the basic vehicle speed Vr1.

Note, the selection of the basic vehicle speed Vr1 is arbitrarily carried out, when, for example, the wheel speeds Vwa–Vwd are grouped into those of the front wheels and those of the rear wheels, the second level may be selected to the front wheels and the maximum level may be selected to the rear wheels.

In FIG. 4, when the wheel speed Vwc has an inclination (deceleration) larger than a predetermined value, the basic vehicle speed Vr1 does not follow the waveform of the wheel speed Vwc and is fixed to a predetermined inclination.

That is, the basic vehicle speed Vr1 is set to the inclination of a maximum deceleration in a period Tg during which the wheel speed Vwc is decelerated by a degree of deceleration which is usually regarded as a maximum value on an actual road surface, for example, by an inclination larger than −1 G (gravitational acceleration).

Figure 5A:
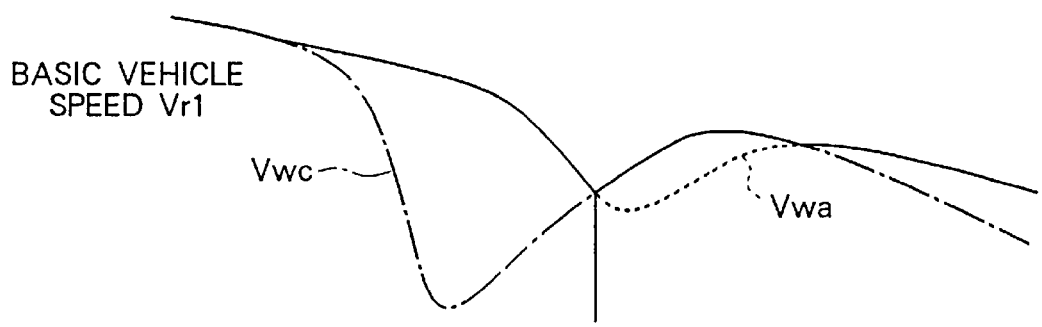
FIG. 5 is a timing chart showing pressure reducing operation executed by the embodiment 1 of the present invention.
Figure 5B:
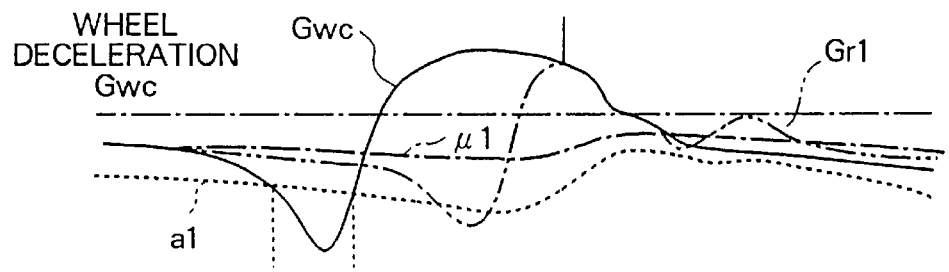
Figure 5C:
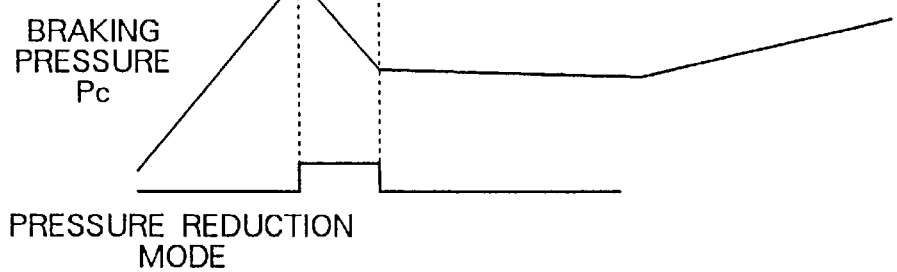

FIG. 5 is a timing chart showing operations of the road surface friction factor presuming means 33, the threshold value setting means 34, the comparison means 35 and the control amount calculation means 40 and shown in the drawing is a case, for example, that a braking pressure Pc to the wheel 1c is adjusted from the decelerating state of the wheel speed Vwc.

That is, in this case, the threshold value a1 (refer to a broken line) is set using the basic vehicle speed Vr1 having the maximum level shown in FIG. 1 and the braking pressure Pc to the wheel 1c is reduced by the comparison of the wheel deceleration Gwc with the threshold value a1.

In FIG. 5, the road surface friction factor presuming means 33 determines a basic deceleration Gr1 (refer to a two-dot-and-dash line) by differentiating the waveform of the basic vehicle speed Vr1 and determines a curve corresponding to the road surface friction factor $\mu$1 (refer to a dot-dash-line) by filtering the basic deceleration Gr1.

The threshold value setting means 34 sets the threshold value a1 (refer to a broken line) by multiplying a predetermined coefficient to the waveform of the road surface friction factor $\mu$1.

The comparison means 35 compares the wheel deceleration $G_{we}$ composed of the differential waveform of the wheel speed Vwc with the threshold value a1 and when the level of the wheel deceleration Gwc exceeds the threshold value a1, the comparison means 35 outputs a result of comparison showing a pressure reducing mode.

With this operation, the control amount calculation means 40 outputs the control signal Cc for reducing the braking pressure Pc to thereby execute an antiskid brake control.

Next, operation of the embodiment 1 of the present invention shown in FIG. 1 will be described with reference to the flowchart of FIG. 6.

Here, the wheel speeds Vwa–Vwd, the wheel decelerations Gwa–Gwd, the basic vehicle speeds Vr1, Vr2, the slip amounts SLa–SLd, the road surface friction factors $\mu$1, $\mu$2, the threshold values a1, a2 and the braking pressure Pa–Pd are shown as a wheel speed Vw, a wheel deceleration Gw, a basic vehicle speed Vr, a slip amount SL, a road surface friction factor $\mu$, a threshold value a and braking pressure P as the general terms thereof.

Figure 6:
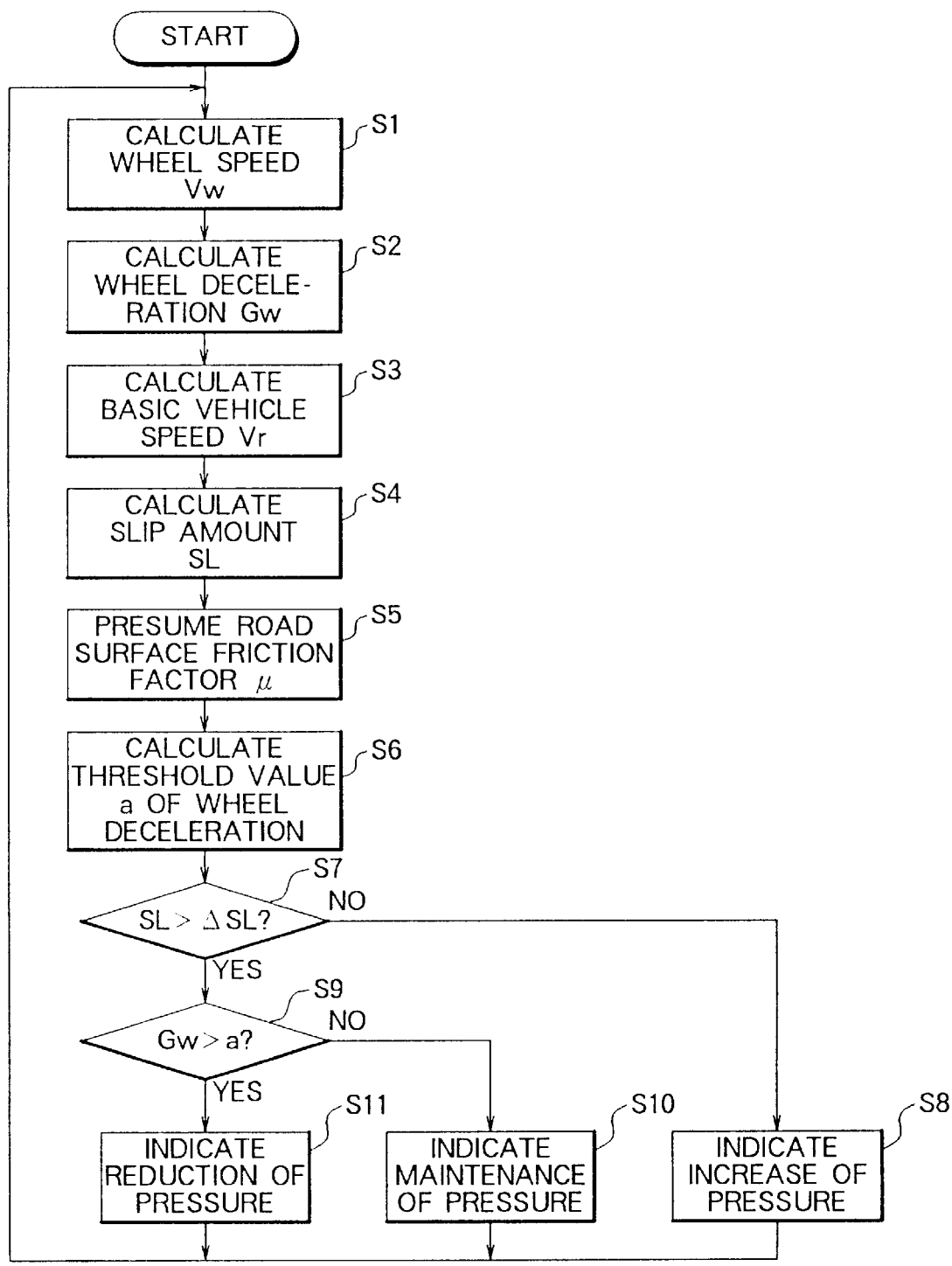
FIG. 6 is a flowchart showing the pressure reducing operation executed by the embodiment 1 of the present invention.

In FIG. 6, first, the ECU 11A initializes the RAM 23b (refer to FIG. 14) and the like in the microcomputer 23.

Subsequently, the wheel speed calculation means 30 in the ECU 11A captures the respective wheel speed signals Va–Vd and determines the wheel speed Vw of each of the wheels 1a –1d (step S1).

At the time, the wheel speed Vw is calculated using, for example, the following cycle calculation method.

That is, the pulse number N of the wheel speed signals Va–Vd (pulse signals having frequencies in accordance with wheel speeds) from the wheel speed sensors 2a–2d is counted after the execution of the calculation at step S1 and the wheel speed Vw is calculated as shown in the following formula (1) using the pulse number N and a period of time Tn from the commencement of the count.

$$Vw = Kv \cdot N/Tn \tag{1}$$

In the formula (1), Kv is a constant which is set in accordance with the outside diameter of the respective wheels 1a–1d, the specification of the wheel speed sensors 2a–2d and the like. Note, it is needless to say that the wheel speed Vw is calculated to each of the wheels 1a–1d.

Subsequently, the wheel deceleration calculation means 31 in the ECU 11A calculates the wheel deceleration Gw by the following formula (2) corresponding to the calculation of the change in time of the wheel speed Vw (a differential value) (step S2).

$$Gw = Kg(Vw_{-1} - Vw)/TL \tag{2}$$

In the formula (2), Kg is a constant, TL is a control cycle of the wheel deceleration calculation means 31, Vw is the wheel speed in the control cycle at the time and $Vw_{-1}$ is the wheel speed in a previous control cycle.

The wheel deceleration Gw shows a wheel decelerated state by Gw>0 and a wheel accelerated state by Gw<0.

Step 2 for calculating the wheel deceleration is executed to the respective wheels 1a–1d likewise step 1 for calculating the wheel speed.

Next, as shown in, for example, in FIG. 3, the basic vehicle speed calculation means 32 calculates the basic vehicle speed Vr of the maximum level (step S3) and the slip amount calculation means 36 calculates the slip amount SL from the difference between the wheel speed Vw and the basic vehicle speed Vr (Vr–Vw) (step S4).

The road surface friction factor presuming means 33 determines the road surface friction factor $\mu$ by differentiating and filtering the basic vehicle speed Vr (step S5) and the threshold value setting means 34 calculates the threshold value a to the wheel deceleration Gw and variably sets the threshold value a (step S6).

At the time, although the threshold value a is set as, for example, the threshold value a1 in FIG. 5, it is specifically calculated by the following formula (3).

$$a = \alpha(\mu + \beta) \tag{3}$$

In the formula (3), a is a constant which is determined taking a noise component to the road surface friction factor $\mu$ into consideration, and as the constant is set to a larger value, the level of the threshold value a is increased so that a high noise component is eliminated.

Further, $\beta$ is a constant which is determined taking the presumed error of accuracy to the road surface friction factor $\mu$ into consideration.

The threshold value a is variably set in accordance with the road surface friction factor $\mu$ as shown in the formula (3).

Therefore, when the threshold value a is set to a large value, the braking pressure P is not reduced until the wheel deceleration Gw of a large value is generated, whereas when the threshold value a is set to a small value, the braking pressure P is reduced when the wheel deceleration Gw of a small value is generated, so that a locked state is avoided at an early time and steering stability is secured.

For example, the wheel speed Vw is grouped into that of the front wheels and that of the rear wheels, the respective constants $\alpha$, $\beta$ in the formula (3) may be set to $\alpha=2$, $\beta=0.2$ with respect to the wheel deceleration Gw of the front wheels and to $\alpha=1.5$, $\beta=0.1$ with respect to the wheel deceleration Gw of the rear wheels. In this case, since the braking pressure P to the rear wheels is controlled to a pressure reducing side as compared with the front wheels, vehicle stability is improved.

Next, the control amount calculation means 40 determines whether the slip amount SL is larger than a predetermined value $\Delta$SL within an allowable range (for example, about 1 km/h) or not (step S7) and when it is determined SL$\leq\Delta$SL (that is, NO) with the slip amount SL within the allowable range, the control amount calculation means 40 indicates to increase the braking pressure P (step S8) and the process returns to step S1.

On the other hand, when the slip amount SL exceeds the allowable range and it is determined SL>$\Delta$SL (that is, YES) at step S7, it is subsequently determined whether the level of the wheel deceleration Gw is larger than the threshold value a or not (step S9).

When the wheel deceleration Gw is smaller than the threshold value a and it is determined Gw$\leq$a (that is, NO), it is indicated to maintain the braking pressure P without executing the antiskid brake control (step S10) and the process returns to step S1.

On the other hand, when the wheel deceleration Gw is larger than the threshold value a and it is determined Gw>a (that is, YES) at step S9, it is indicated to reduce the braking pressure P to avoid the locked state (step S11) and the process returns to step S1.

At steps S8, S10 and S11 where indications are made to the braking pressure P, the control signals Ca–Cd and CM are created in accordance with the respective indications.

As described above, the basic vehicle speed Vr for presuming the road surface friction factor $\mu$ can be properly selected by presuming the road surface friction factor $\mu$ from the change in time of the plurality of basic vehicle speeds Vr. Further, the road surface friction factor $\mu$ corresponding to each of the wheels of the respective groups can be presumed with high reliability by processing the grouped wheel speeds.

Further, the threshold value a can be properly set in accordance with a road surface state (the locked state of the wheels) by determining the threshold value a in accordance with the presumed road surface friction factor $\mu$, whereby the locked state can be securely avoided without sacrificing a braking capability.

That is, the braking pressure P can be finely adjusted in accordance with the road surface friction factor $\mu$.

Embodiment 2

Although the wheel deceleration Gw calculated by the wheel deceleration calculation means 31 is input to the comparison means 35 as it is in the embodiment 1, the wheel deceleration Gw may be subjected to filter processing.

Figure 7:
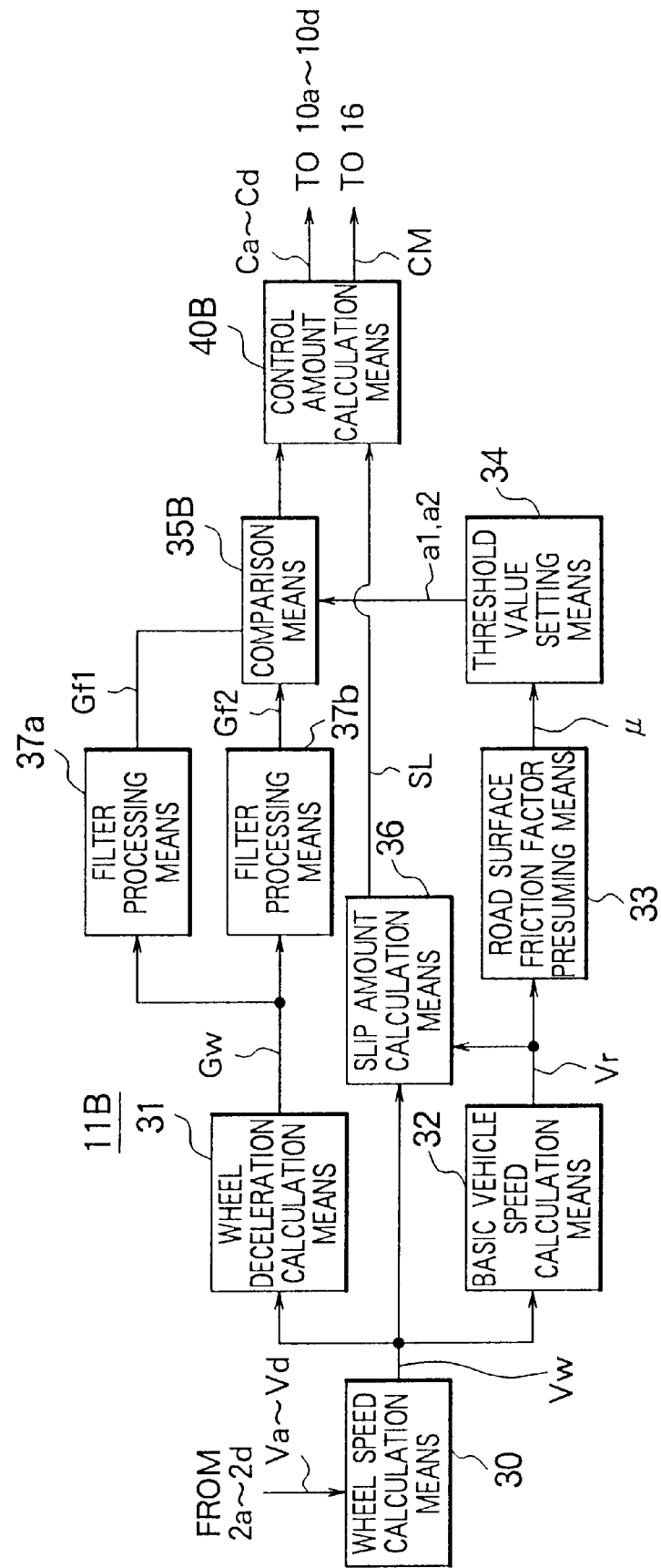
FIG. 7 is a function block diagram showing an embodiment 2 of the present invention.

FIG. 7 is a function block diagram showing an embodiment 2 of the present invention arranged such that the wheel deceleration Gw is compared with the threshold value after it is subjected to filtering processing, wherein components similar to those mentioned above are denoted by the same numerals and the detailed description thereof is omitted here.

In FIG. 7, two systems of filter processing means 37a, 37b are interposed in parallel with each other between the wheel deceleration calculation means 31 and the comparison means 35B in an ECU 11B.

The filter processing means 37a carries out a filter processing with a relatively prompt response characteristic and creates a wheel deceleration filtering value Gf1 having a high follow-up property to the wheel deceleration Gw.

The filter processing means 37b carries out filter processing with a response characteristic which is slower than that of the processing means 37a and creates a wheel deceleration filtering value Gf2 having a low follow-up property to the wheel deceleration Gw.

Threshold value setting means 34 sets a first threshold value a1 having a relatively high level and a second threshold value a2 having a level smaller than that of the threshold value a1 depending upon the road surface friction factor $\mu$.

The comparison means 35B compares the wheel deceleration filtering value Gf1 having the high response characteristic with the first threshold value a1 having the high level, and when Gf1>a1, it sets a comparison output to an H level.

Further, the comparison means 35B compares the wheel deceleration filtering value Gf2 having the low response characteristic with the second threshold value a2 having the small level, and when Gf2>a2, it sets a comparison output to an H level.

Therefore, the comparison means 35B includes first comparison means for creating the comparison output when the deceleration filtering value Gf1 exceeds the threshold value a1 and second comparison means for creating the comparison output when the deceleration filtering value Gf2 exceeds the threshold value a2. The function of the comparison means 35B may be included in control amount calculation means 40B.

The control amount calculation means 40B creates control amounts for reducing the braking pressure in response to at least one of the first and second comparison outputs from the comparison means 35B.

Note, the threshold values a1, a2 are variably set in accordance with the filter coefficients of the filter processing means 37a and the filter processing means 37b.

Likewise the above mentioned, road surface friction factor presuming means 33 individually determines the road surface friction factors $\mu1$, $\mu2$ to the basic vehicle speeds Vr1, Vr2 of the respective groups and the threshold value setting means 34 individually sets threshold values a1, a2 to the road surface friction factor $\mu1$ as well as individually sets threshold values a1, a2 to the road surface friction factor $\mu2$.

Further, the control amount calculation means 40B individually calculates control amounts based on the result of comparison of the respective wheel deceleration filtering values with the threshold values of the respective groups.

Next, antiskid brake control operation of the second embodiment of the present invention will described with reference to the flowchart of FIG. 8.

Figure 8:
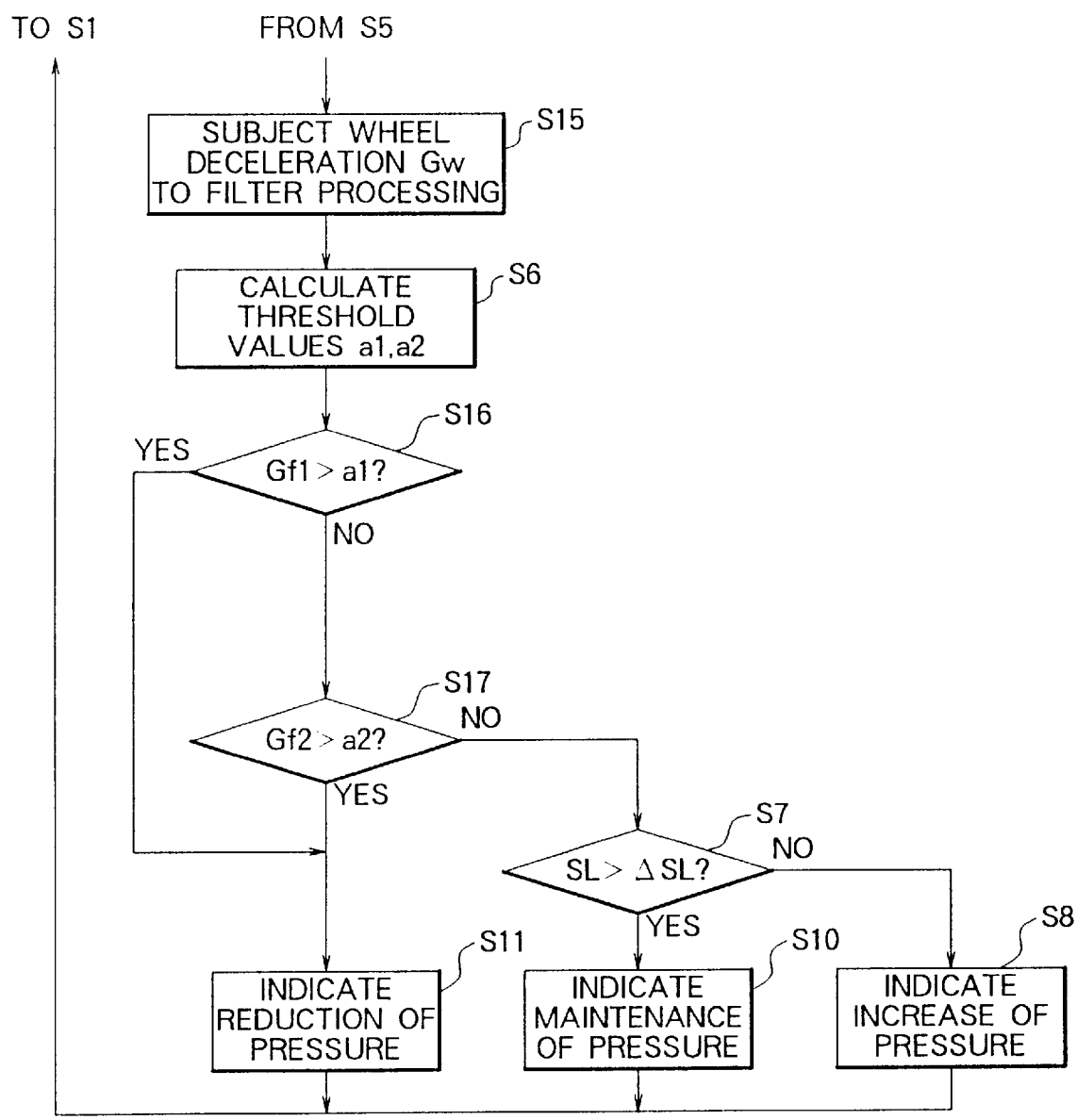
FIG. 8 is a flowchart showing pressure reducing operation executed by the embodiment 2 of the present invention.

In FIG. 8, not shown steps S1–S5 are as shown in FIG. 6 and steps S6–S8 and steps S10 and S11 are the same as those mentioned above.

In this case, following to step S5 for presuming the road surface friction factor $\mu$, the filter processing means 37a and 37b subject the wheel deceleration Gw to a low pass filter processing and creates the wheel deceleration filtering values Gf1 and Gf2 from which noise components have been removed (step S15).

The threshold value setting means 34 calculates the two threshold values a1 and a2 having a large value and a small value in accordance with the above formula (3) (step S6).

That is, the threshold value setting means 34 calculates the threshold value a1 and a2 which satisfy the relationship a1>a2 using constants $\alpha1$ and $\alpha2$ satisfying the relationship $\alpha1>\alpha2$ as described below.

$$a1=\alpha1(\beta+\beta)$$

$$a2=\alpha2(\mu+\beta)$$

Next, the comparison means 35B determines whether the level of the wheel deceleration filtering value Gf1 exceeds the threshold value a1 or not (step S16), and when it is determined Gf1>a1 (that is, YES), the process goes to step S11 for indicating the reduction of the braking pressure P.

Whereas, when it is determined Gf1<a1 (that is, NO), it is subsequently determined whether the level of the wheel deceleration filtering value Gf2 exceeds the threshold value a2 or not (step S17).

When it is determined Gf2>a2 (that is, YES), the process goes to step S11 for indicating the reduction of the braking pressure P, whereas when it is determined Gf2≦a2 (that is, NO), the process subsequently goes to step S7 for determining whether the slip amount SL exceeds the predetermined amount ΔSL or not.

When it is determined SL>ΔSL (that is, YES) at step S7, the process goes to step S10 for indicating to maintain the braking pressure P, whereas when it is determined SL≦ΔSL (that is, NO), the process goes to step S8 for increasing the braking pressure P.

That is, when the slip amount SL is very small in the state that the braking pressure P is not reduced, the braking capability is increased by increasing the braking pressure P, whereas when any of the pressure reducing condition and the pressure increasing condition is not established, the braking pressure P is maintained.

As described above, since the determination at step S17 is made YES even if, for example, the slip amount SL is gradually generated without generating the wheel deceleration Gw in a large amount, the process is permitted to go to step S11 where the braking pressure P is reduced by comparing the threshold value a2 which is smaller than the threshold value a1 with the wheel deceleration filtering value Gf2 from which the noise component has been removed in a large amount.

Further, the effect of a disturbance noise contained in the wheel deceleration Gw can be securely removed by individually setting the threshold values a1, a2 to the wheel deceleration filtering values Gf1, Gf2 which have different filter characteristics.

Further, since the effect of the noise component to a road surface can be taken into consideration by changing the threshold value a in accordance with the road surface friction factor $\mu$, reliability to control can be improved.

Embodiment 3

Although the slip amount SL calculated by the slip amount calculation means 36 is input to the control amount calculation means 40 as it is in the above embodiment 1, the slip amount SL may be subjected to the filter processing.

Figure 9:
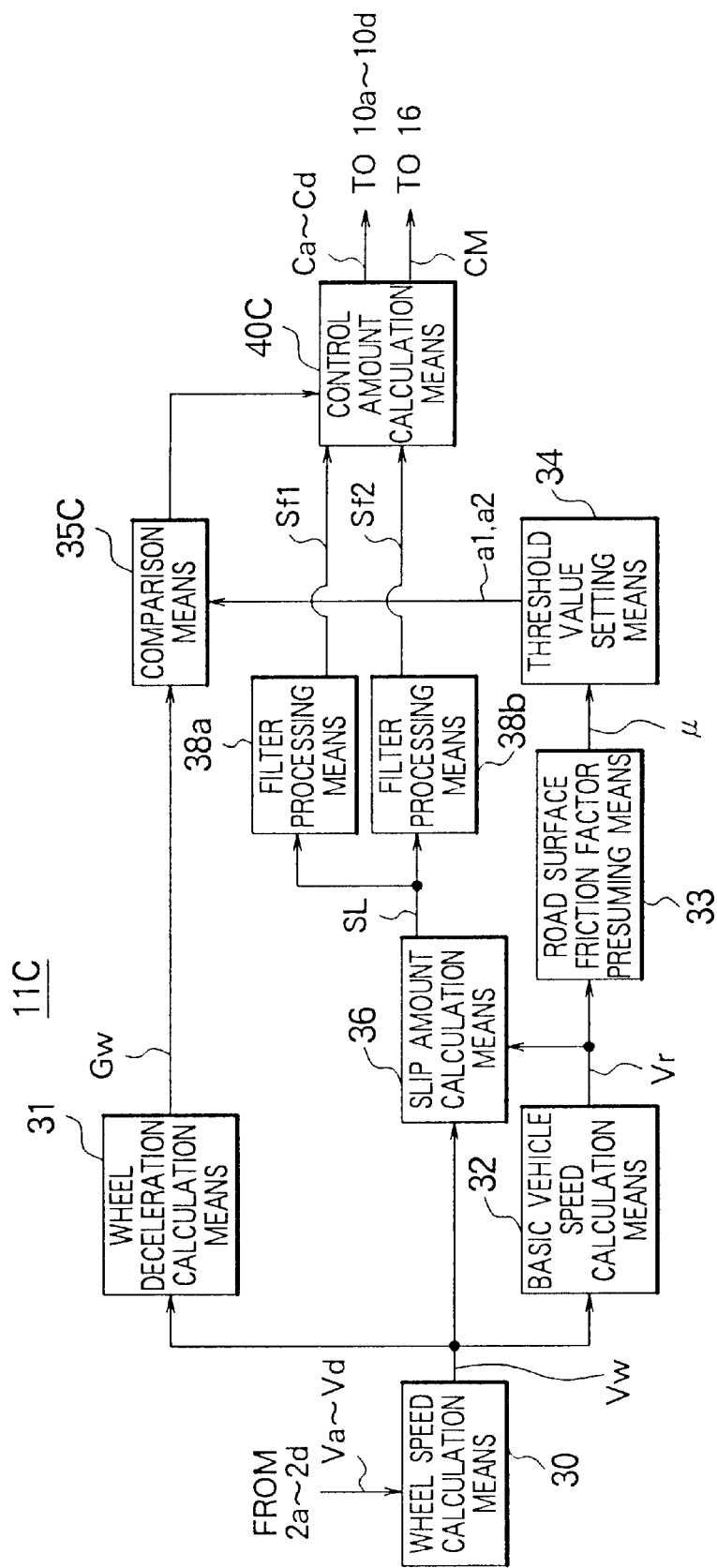
FIG. 9 a function block diagram showing an embodiment 3 of the present invention.

FIG. 9 is a function block diagram showing an embodiment 3 of the present invention arranged such that the slip amount SL is input to control amount calculation means 40C after it is subjected to the filter processing, wherein components similar to those mentioned above are denoted by the same numerals and the detailed description thereof is omitted here.

Figure 10:
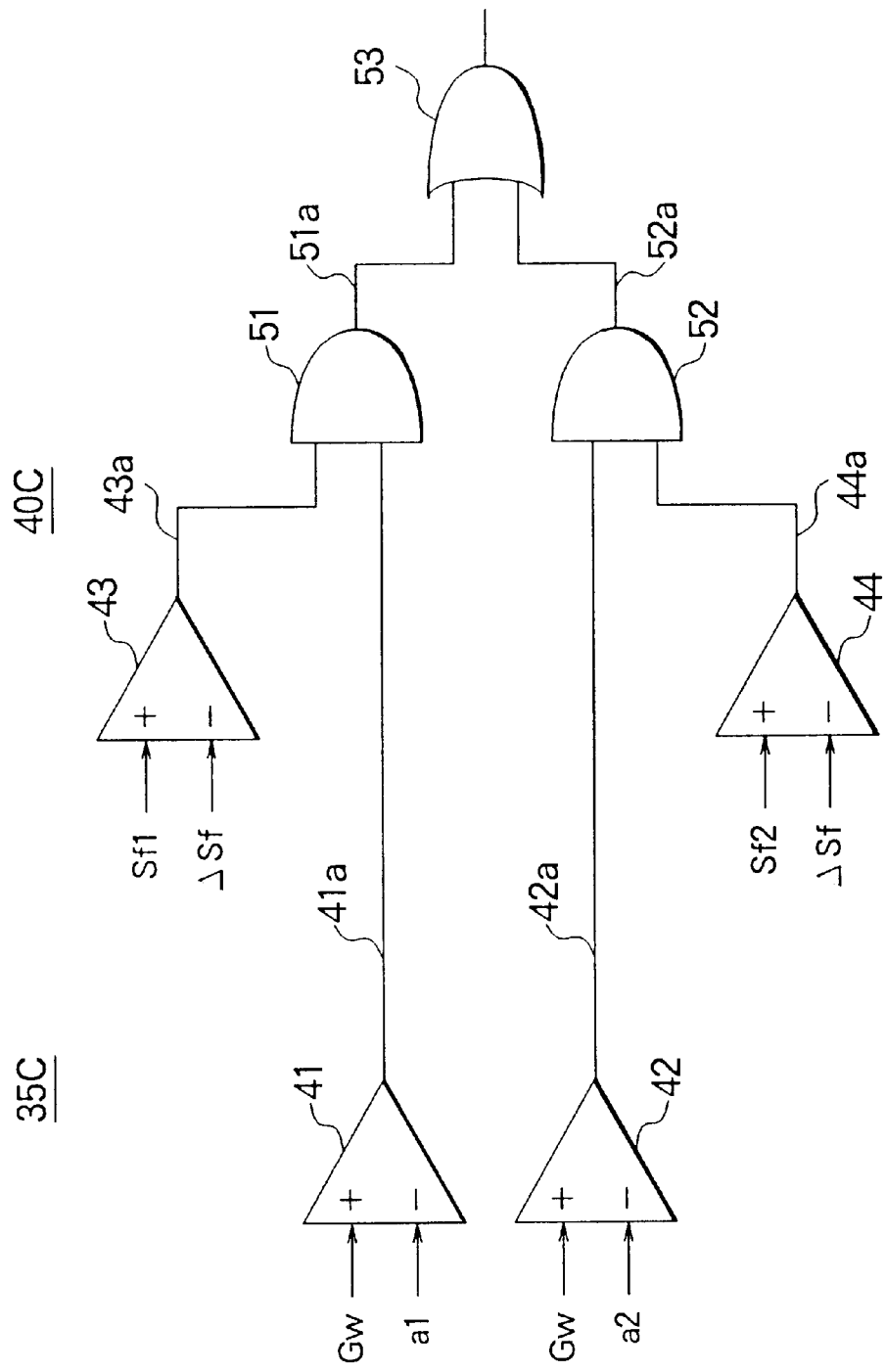
FIG. 10 is a logic circuit diagram showing an example of the arrangement of comparison means and control amount calculation means in the embodiment 3 of the present invention.

FIG. 10 is a circuit diagram showing examples of the specific arrangements of comparison means 35C and the control amount calculation means 40C in FIG. 9 and the function of the comparison means 35C may be contained in the control amount calculation means 40C.

In FIG. 9, two systems of filter processing means 38a, 38b are interposed in parallel with each other between the slip amount calculation means 36 and the control amount calculation means 40C in an ECU 11C.

Threshold value setting means 34 sets the threshold values a1 and a2 having a large value and a small value depending upon the road surface friction factor p.

The filter processing means 38a carries out a filter processing with a relatively prompt response characteristic and creates a slip amount filtering value Sf1 having a high follow-up property to a slip amount SL.

The filter processing means 38b carries out filter processing with a response characteristic which is slower than that of the filter processing means 38a and creates a slip amount filtering value Sf2 having a low follow-up property to the slip amount SL.

In FIG. 10, the comparison means 35C includes first comparison means 41 for creating a first comparison output 41a when the wheel deceleration Gw exceeds the first threshold value a1 and second comparison means 42 for creating a second comparison output 42a when the wheel deceleration Gw exceeds the second threshold value a2.

The control amount calculation means 40C includes allowable amount setting means for setting the allowable value ΔSf of the slip amount, third comparison means 43 for creating a third comparison output 43a when the first slip amount filtering value Sf1 exceeds the allowable value ΔSf and a fourth comparison means 44 for creating a fourth comparison output 44a when the second slip amount filtering value Sf2 exceeds the allowable value ΔSf.

The control amount calculation means 40C includes a first AND circuit 51 for creating a first AND output 51a by ANDing the first comparison output 41a with the third comparison output 43a, a second AND circuit 52 for creating a second AND output 52a by ANDing the second comparison output 42a with the fourth comparison output 44a and an OR circuit 53 for ORing the first AND output 51a with the second AND output 52a and creates a control amount for reducing the braking pressure P in response to at least one of the first AND output 51a and the second AND output 52a.

Next, antiskid brake control operation of the third embodiment of the present invention shown in FIG. 9 and FIG. 10 will be described with reference to the flowchart of FIG. 11.

Figure 11:
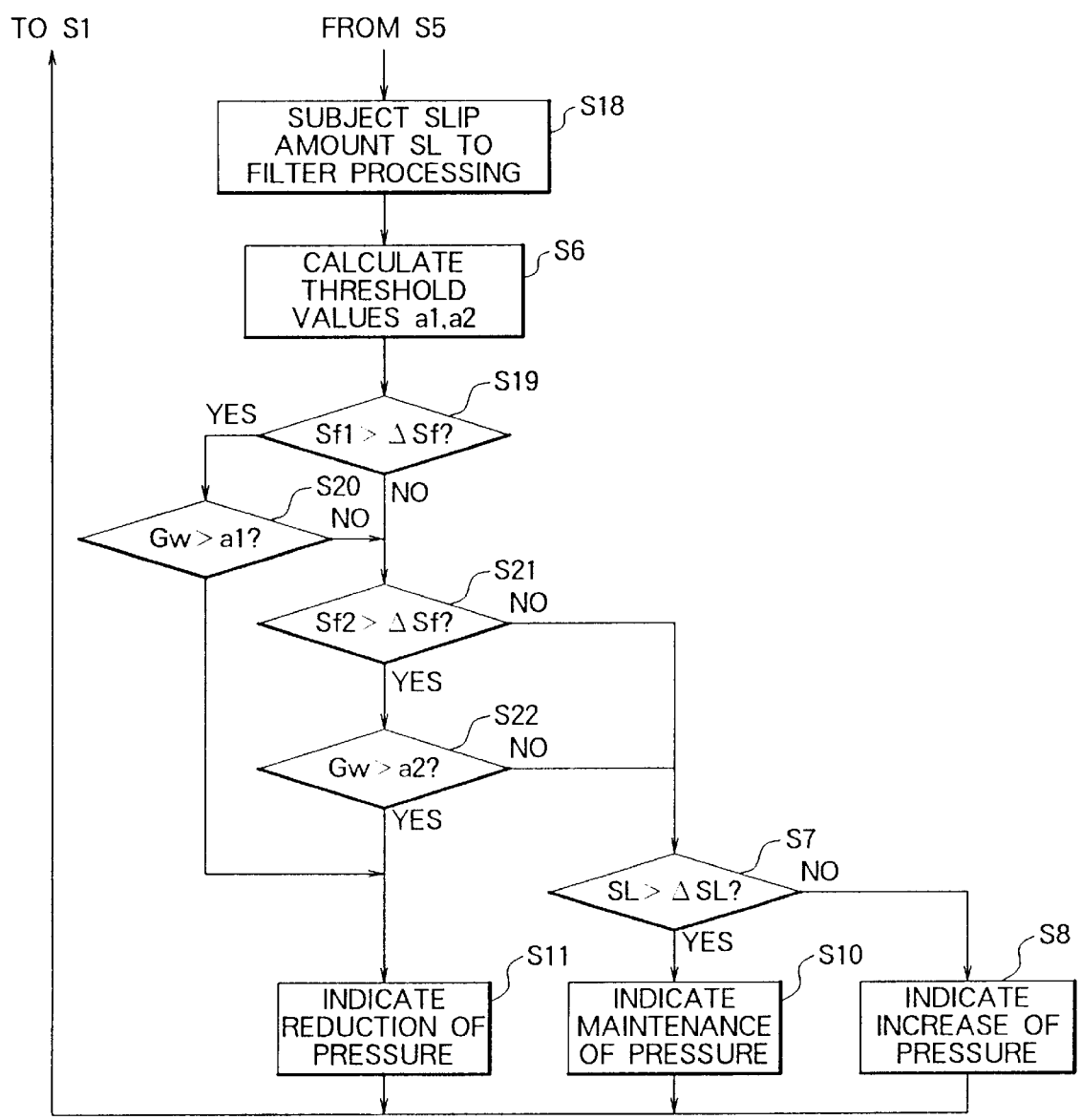
FIG. 11 is a flowchart showing pressure reducing operation executed by the embodiment 3 of the present invention.

In FIG. 11, not shown steps S1–S5 are as shown in FIG. 6 and steps S6–S8 and steps S10 and S11 are the same as those mentioned above.

In this case, subsequently to step S5 for presuming the road surface friction factor $\mu$, the filter processing means 38a and 38b subject the slip amount SL to a low pass filter processing and creates the slip amount filtering values Sf1 and Sf2 from which a noise component has been removed (step S18).

The threshold value setting means 34 calculates the two threshold values a1 and a2 having a large value and a small value in accordance with the above formula (3) (step S6).

For example, the threshold value setting means 34 calculates the threshold value a1 and a2 which satisfy the relationship a1>a2 using constants α1 (for example, α1=2) and α2 (for example, α2=1.5) satisfying the relationship α1>α2 as described below.

$$a1=\alpha1(\mu+\beta)$$

$$a2=\alpha2(\mu+\beta)$$

Next, the control amount calculation means 40C determines whether the slip amount filtering value Sf1 having high responsiveness exceeds an allowable value ΔSf (for example, about 3 Kg/h) or not (step S19). When it is determined Sf1>ΔSf (that is, YES) at step S19, it is subsequently determined whether the wheel deceleration Gw exceeds the threshold value a1 of the high level or not (step S20), and when it is determined Gw>a1 (that is, YES), the process goes to step S11 for indicating the reduction of the braking pressure P.

On the other hand, when it is determined Sf1<ΔSf or Gw≦a1 (that is, NO) at steps S19, S20, it is subsequently determined whether the slip amount filtering value Sf2 having low responsiveness exceeds the allowable value ΔSf or not (step S21).

When it is determined Sf2>ΔSf (that is, YES) at step S21, it is subsequently determined whether the wheel deceleration Gw exceeds the threshold value a2 of the low level or not (step S22), and when it is determined Gw>a2 (that is, YES), the process goes to step S11 for indicating the reduction of the braking pressure P.

On the other hand, when it is determined Sf2≦ΔSf or Gw<a2 (that is NO) at steps S21, S22, the process goes to step S7 and determines whether the slip amount SL before it is subjected to the filtering processing exceeds the predetermined amount ΔSL (for example, about 1 Km/h) or not.

When it is determined SL>ΔSL (that is, YES), the process goes to step S10 for indicating the maintenance of the braking pressure P, whereas when it is determined SL≦ΔSL (that is, NO), the process goes to step S8 for indicating the increase of the braking pressure P.

As described above, since the slip amount filtering values Sf1 and Sf2 from which the noise components contained in the slip amount SL has been removed is obtained, slip can be detected with high reliability.

In particular, since the slip amount filtering value Sf2 represents a securely occurred large slip amount, it can be compared with the threshold value a2 of the low level having a small surplus, by which the reliability of the determination is more improved.

Further, when the threshold value a is set in accordance with parameter characteristics to be compared, for example, the filter characteristics of the slip amount SL, the braking pressure P can be finely adjusted in accordance with the behaviors of the wheels 1a–1d.

That is, various situations can be coped with by setting a plurality of threshold values a1, a2 in accordance with the road surface friction factor p taking the filter characteristics of the slip amount SL into consideration.

For example, when the speeds of the wheels 1a–1d are abruptly reduced in accordance with the situations thereof, the slip amount SL and the wheel deceleration Gw are greatly reduced. However, the threshold value a having good responsiveness can be set in accordance with the great change although a filtering (noise removing) effect is small.

On the contrary, the threshold value a can be also set so as to remove noise-like vibration caused by a bad road to cope with a case that wheels 1a–1d gradually fall by setting a filtering effect large, although responsiveness is slow.

Embodiment 4

Although only the predetermine value ΔSL corresponding to the minimum allowable value is used as the comparison reference value of the slip amount SL in the embodiment 1, the magnitude of the slip amount SL may be determined stepwise by setting a plurality of comparison reference values and the threshold value a of the wheel deceleration Gw may be variably set in accordance with the magnitude of the slip amount SL.

Figure 12:
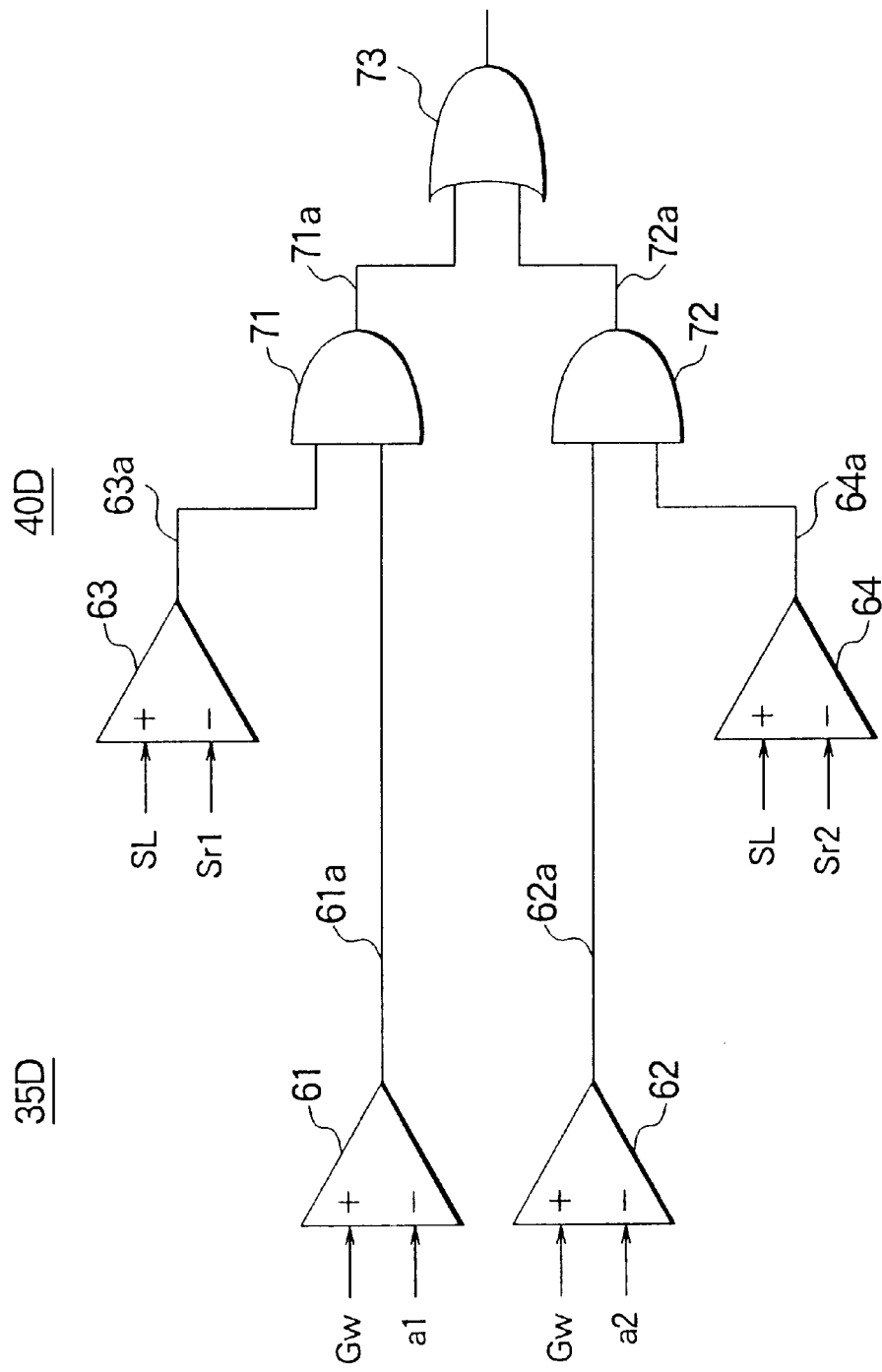
FIG. 12 is a logic circuit diagram showing an example of the arrangement of comparison means and control amount calculation means in an embodiment 4 of the present invention.

FIG. 12 is a circuit diagram showing an example of the arrangement of control amount calculation means 40D according to an embodiment 4 of the present invention and shows a case that a plurality of comparison reference values (allowable values) Sr1 and Sr2 (Sr1<Sr2) are set to the slip amount SL as a condition for reducing the braking pressure P.

Figure 13:
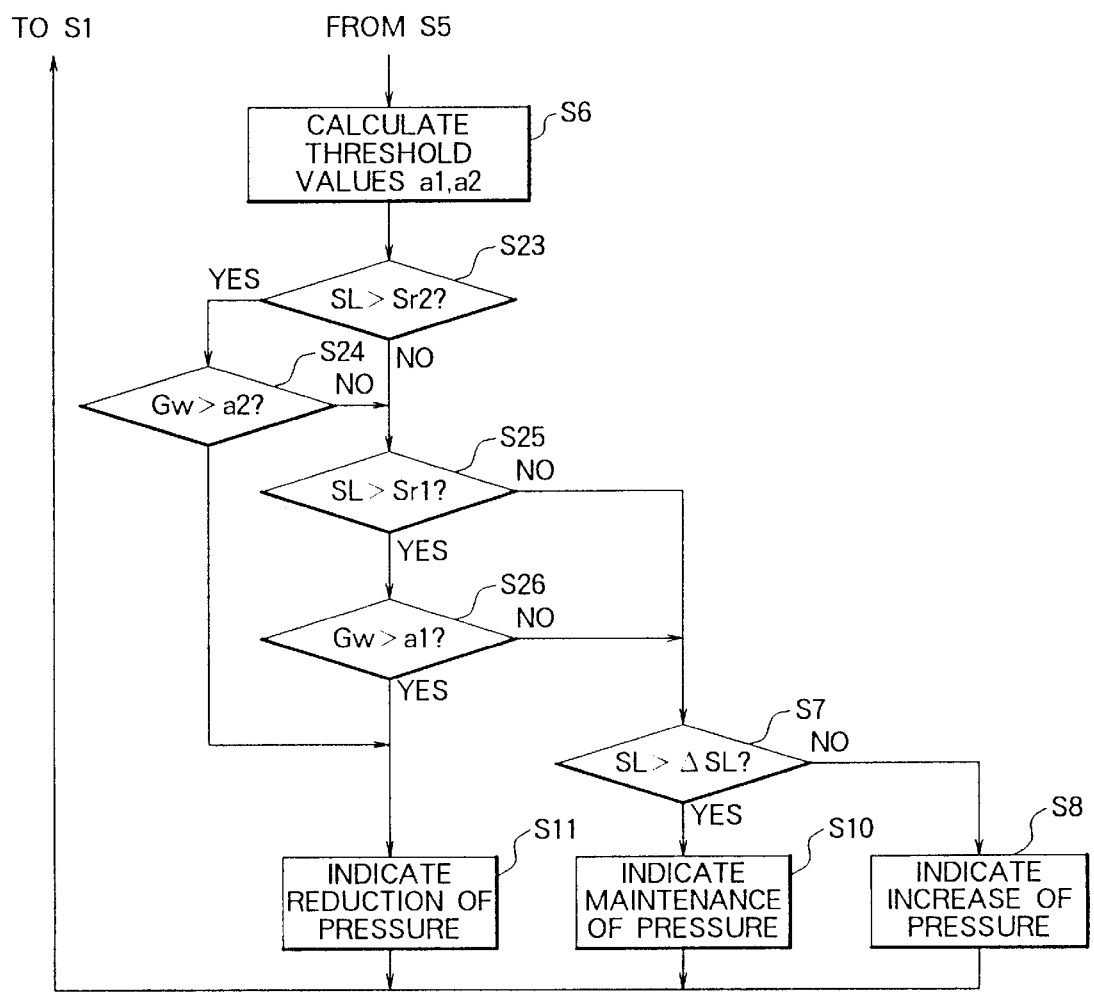
FIG. 13 a flowchart showing pressure reducing operation executed by the embodiment 4 of the present invention.

FIG. 13 is a flowchart showing antiskid brake control operation of the embodiment 4 of the present invention. Note, the arrangement of the apparatus as a whole of the embodiment 4 is as shown in FIG. 1 and FIG. 14 except that the function of the control amount calculation means 40D in an ECU is partially different.

In FIG. 12, a comparison means 35D includes first comparison means 61 for creating a first comparison output 61a when a wheel deceleration Gw exceeds the first threshold value a1 and second comparison means 62 for creating a second comparison output 62a when the wheel deceleration Gw exceeds the second threshold value a2 (<a1).

The control amount calculation means 40D includes first allowable value setting means for setting a first allowable value Sr1 having a relatively small level to the slip amount SL, second allowable value setting means for setting a second allowable value Sr2 whose level is larger than that of the first allowable value Sr1 to the slip amount SL, third comparison means 63 for creating a third comparison output 63a when the slip amount SL exceeds the first allowable value Sr1 and fourth comparison means 64 for setting a fourth comparison output 64a when the slip amount SL exceeds the second allowable value Sr2.

The control amount calculation means 40D further includes a first AND circuit 71 for creating a first AND output 71a by ANDing the first comparison output 61a with the third comparison output 63a, a second AND circuit 72 for creating a second AND output 72a by ANDing the second comparison output 62a with the fourth comparison output 64a and an OR circuit 73 for ORing the first AND output 71a with the second AND output 72a and creates a control amount for reducing the braking pressure P in response to at least one of the first AND output 71a and the second AND output 72a.

Next, antiskid brake control operation of the embodiment 4 of the present invention shown in FIG. 12 will be described with reference to the flowchart of FIG. 13.

In FIG. 13, not shown steps S1–S5 are as shown in FIG. 6 and steps S6–S8 and steps S10 and S11 are the same as those mentioned above.

In this case, the allowable value setting means (not shown) in the control amount calculation means 40D previously sets the allowable values Sr1, Sr2 (Sr1<Sr2) having a large value and a small value. The respective allowable values are, for example, Sr1=about 1.5 Km/h and Sr2=about 3 Km/h.

The threshold value setting means 34 in the ECU (refer to FIG. 1) calculates the threshold values a1, a2 satisfying the relationship a1 >a2 by setting the respective constants α, β in the aforesaid formula (3) to, for example, α1=2, α2=1.5, β1=0.2, β2=0.1, respectively.

Following to step S6 for setting the threshold value in FIG. 13, the comparison means in the control amount calculation means 40D first determines whether the slip amount SL exceeds the high level allowable value Sr2 or not (step S23) and when it is determined SL>Sr2 (that is YES), it is subsequently determined that whether the wheel deceleration Gw exceeds the low level threshold value a1 or not (step S24).

When it is determined Gw>a2 (that is, YES) at step S24, the process goes to step S11 for indicating the reduction of the braking pressure P, whereas when it is determined Gw≦a2 (that is, NO), it is subsequently determined whether the slip amount SL exceeds the low level allowable value Sr2 or not (step S25).

Note, when it is determined SL<Sr2 (that is, NO) at step S23, the process also goes to step S25.

When it is determined SL>Sr1 (that is, YES) at step S25, it is subsequently determined whether the wheel deceleration Gw exceeds the high level threshold value a1 or not (step S26), and when it is determined Gw>a1 (that is, YES), the process goes to step S11 for indicating the reduction of the braking pressure P.

On the other hand, when it is determined SL≦Sr1 or Gw≦a1 (that is, NO) at steps S25, 26, the process goes to step S8 for indicating the increase of the braking pressure P or to step S10 for indicating the maintenance of the braking pressure P through determination step S7.

When it is determined for example, SL>Sr2 (that is, YES) at step S23, since the slip amount SL is relatively large, the braking pressure P must be promptly reduced to prevent the locked state.

Therefore, the process goes to step S11 for indicating the reduction of the braking pressure at the time the wheel deceleration Gw exceeds the low level threshold value a2 at step S24.

On the other hand, when it is determined SL>Sr1 (that is YES) at step S25, since the SL is relatively small and there is less possibility for causing the locked state, the braking capability is preferentially secured over the pressure reduction control.

Therefore, the process goes to step S11 for indicating the reduction of the braking pressure P at the time the wheel deceleration Gw exceeds the high level threshold value a1 at step S26.

However, the constant p in the aforesaid formula (3) may be set to a relatively large value to get a surplus to a noise component.

As described above, the threshold value which takes a road surface state of a bad road and the like into consideration can be set by setting the threshold value a in accordance with the magnitude of the slip amount SL.

Further, since the threshold value is changed in accordance with the road surface friction factor $\mu$, the effect of the noise component on a road surface can be taken into consideration, by which reliability to control is improved.

Further, when the magnitude of the slip amount SL is small, the reduction of the braking pressure P is made difficult by setting the threshold value a of the wheel deceleration Gw to a large value, whereas when the slip amount SL is large, the threshold value a of the wheel deceleration Gw is set to a small value, so that the braking pressure P can be reduced even in a small speed reducing state which permits the improvement of the reliability to a body.

Embodiment 5

Although the threshold values a of the wheel deceleration Gw which correspond to the front wheel group and the rear wheel group of the wheels 1a–1d, respectively is not described in detail in the embodiment 1, the threshold value setting means 34 may set the threshold value corresponding to the front wheels to a level larger than that corresponding to the rear wheels.

With this arrangement, the braking pressure P to the front wheels which greatly affect the braking capability is increased to thereby prevent the reduction of the braking capability as well as the stickiness of the rear wheels is improved, so that stability is not lowered.

What is claimed is:

1. An antiskid brake controller, comprising:

means for respectively detecting the rotational speeds of a plurality of wheels as respective wheel speeds;

means for adjusting a braking force applied to each of said wheels in response to the application of a brake; and an ECU for determining adjustment controls for adjusting said braking force based on the rotational speeds of said wheels when said brake is applied, and supplying said adjustment controls to said braking force adjusting means to said braking force adjustment means to prevent said wheels from locking when said brake is applied;

wherein said ECU comprises:

means for calculating decelerations in said wheels, respectively, based on said respective rotational speeds when the brake is applied;

means for grouping said rotational speeds of said wheels into a plurality of groups each comprising the rotational speed of at least one rear wheel;

means for calculating basic vehicle speeds of said groups, respectively, based on said rotational speeds of said wheels in each of said groups;

means for determining a road surface friction factor based on a change in time of one of said basic vehicle speeds when the brake is applied;

means for variably setting threshold values of wheel decelerations in accordance with said road surface friction factor; and means for calculating said adjustment controls based on a result of a comparison of said wheel decelerations with said threshold values.

2. An antiskid brake controller according to claim 1, wherein said road surface friction factor means determines road surface friction factors respectively corresponding to said basic vehicle speeds of said groups, respectively;

said threshold value setting means sets said threshold values in accordance with said road surface friction factors, respectively; and said control amount calculating means calculates said adjustment controls based on said result of said comparison of said wheel decelerations of said groups with said threshold values.

3. An antiskid brake controller according to claim 1, wherein said basic wheel speed calculation means comprises basic vehicle speed selection means for selecting one of said basic vehicle speeds of said groups;

said road surface friction factor means determines said road surface friction factor based on a change in time of a selected basic vehicle speed; and said threshold value setting means sets said threshold values in accordance with said road surface friction factor.

4. An antiskid brake controller according to claim 1, wherein each of the plurality of groups of said rotational speeds of said wheels comprises the rotational speed of at least one rear wheel and the rotational speed of least one front wheel.

5. An antiskid brake controller according to claim 4, wherein the plurality of groups of said rotational speeds of said wheels comprises a group comprising the rotational speeds of two rear wheels and at least one front wheel.

6. An antiskid brake controller according to claim 1, wherein threshold value setting means sets different threshold values for front wheels and rear wheels in accordance with a determined road surface friction factor.

7. An antiskid brake controller according to claim 1, comprising:

first filter processing means for sujecting the wheel decelerations to a filter processing with a relatively prompt response characteristic and creating first wheel deceleration filtering values; and second filter processing means for subjecting the wheel decelerations to a filter processing with a response characteristic which is slower than that of said first filter processing means and creating second wheel deceleration filtering values:

wherein said threshold value setting means sets a first threshold value having a relatively large level and a second threshold value having a level smaller than that of the first threshold value depending upon the road surface friction factor; and said control amount calculation means comprises:

first comparison means for creating a first comparison output when the first wheel deceleration filtering value exceeds the first threshold value; and second comparison means for creating a second comparison output when the second wheel deceleration filtering value exceeds the second threshold value;

whereby said control amount calculation means creates a control amount for reducing the braking pressure in response to at least one of the first and second comparison outputs.

8. An antiskid brake controller according to claim 1, comprising:

slip amount calculation means for calculating slip amounts for the respective wheels from the differences between the basic vehicle speed and the respective wheel speeds;

first filter processing means for subjecting the slip amounts to a filter processing with a relatively prompt response characteristic and creating first slip amount filtering values; and second filter processing means for subjecting the slip mounts to a filter processing with a response characteristic which is slower than that of said first filter processing means and creating second slip amount filtering values;

wherein said threshold value setting means sets a first threshold value having a relatively large level and a second threshold value having a level smaller than that of the first threshold value depending upon the road surface friction factor; and said control amount calculation means comprises:

first comparison means for creating a first comparison output when the wheel deceleration exceeds the first threshold value;

second comparison means for creating a second comparison output when the wheel deceleration exceeds the second threshold value;

allowable value setting means for setting the allowable value of the slip amount;

third comparison means for creating a third comparison output when the first slip amount filtering value exceeds the allowable value;

fourth comparison means for creating a fourth comparison output when the second slip amount filtering value exceeds the allowable value;

a first AND circuit for creating a first AND output by ANDing the first comparison output with the third comparison output;

a second AND circuit for creating a second AND output by ANDing the second comparison output with the fourth comparison output; and an OR circuit for creating a control amount for reducing the braking pressure in response to at least one of the first AND output and the second AND output.

9. An antiskid brake controller according to claim 1, comprising:

slip amount calculation means for calculating slip amounts for the respective wheels from differences between the basic vehicle speed and the respective wheel speeds;

wherein said threshold value setting means sets a first threshold value having a relatively large level and a second threshold value having a level smaller than that of the first threshold value depending upon the road surface friction factor; and said control amount calculation means comprises:

first comparison means for creating a first comparison output when the wheel deceleration exceeds the first threshold value;

second comparison means for creating a second comparison output when the wheel deceleration exceeds the second threshold value;

first allowable value setting means for setting a first allowable value having a relatively small level to the slip amount.

second allowable value setting means a second allowable value having a level larger than that of the first allowable value to the slip amount;

third comparison means for creating a third comparison output when the slip amount exceeds the first allowable value;

fourth comparison means for creating a fourth comparison output when the slip amount exceeds the second allowable value;

a first AND circuit for creating a first AND output by ANDing the first comparison output with the third comparison output;

a second AND circuit for creating a second AND output by ANDing the second comparison output with the fourth comparison output; and an OR circuit for creating a control amount for reducing the braking pressure in response to at least one of the first and second AND outputs.

10. An antiskid brake controller according to claim 1, wherein:

said threshold value setting means individually sets the threshold values for the respective groups in accordance with the road surface friction factors; and the threshold value corresponding to the front wheels is set to a level larger than that of the threshold value corresponding to the rear wheels.

* * * * *